(12) United States Patent
Tsuchiya et al.

(10) Patent No.: US 7,982,845 B2
(45) Date of Patent: Jul. 19, 2011

(54) DISPLAY DEVICE WITH SUFFICIENT ADHESIVE STRENGTH FOR SEALING MATERIAL

(75) Inventors: Aki Tsuchiya, Mobara (JP); Takashi Yamamoto, Chiba (JP); Akira Ishii, Mobara (JP); Naoki Kikuchi, Mobara (JP); Yoshihiro Arai, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 336 days.

(21) Appl. No.: 12/379,106

(22) Filed: Feb. 12, 2009

(65) Prior Publication Data
US 2009/0207370 A1    Aug. 20, 2009

(30) Foreign Application Priority Data

Feb. 14, 2008    (JP) .................................. 2008-032563

(51) Int. Cl.
*G02F 1/1339*    (2006.01)
*G02F 1/1345*    (2006.01)

(52) U.S. Cl. ......... 349/153; 349/190; 349/154; 349/149

(58) Field of Classification Search .................. 349/153, 349/190, 154, 149
See application file for complete search history.

(56) References Cited

U.S. PATENT DOCUMENTS

| | | | | |
|---|---|---|---|---|
| 6,124,917 A * | 9/2000 | Fujioka et al. | ................ | 349/153 |
| 6,593,992 B1 * | 7/2003 | Chin et al. | .................... | 349/153 |
| 6,650,392 B2 * | 11/2003 | Iwanaga et al. | ............... | 349/153 |
| 6,831,725 B2 * | 12/2004 | Niiya | ............................. | 349/153 |
| 7,527,835 B2 * | 5/2009 | Tanaka | ........................... | 428/1.1 |

* cited by examiner

*Primary Examiner* — Mike Qi
(74) *Attorney, Agent, or Firm* — Stites & Harbison, PLLC; Juan Carlos A. Marquez, Esq

(57) ABSTRACT

A display device which can ensure a sufficient adhesive strength on an adhering surface between each of a pair of substrates of a liquid crystal display panel and a sealing material is provided. A display device includes: a first substrate on which a predetermined integrated circuit is formed; a second substrate which is arranged on one surface of the first substrate in an overlapping manner; and an adhesive material which is arranged between the first substrate and the second substrate and has an annular planar shape as viewed from the surface of the first substrate, the adhesive material being provided for adhering the first substrate and the second substrate, wherein an outer periphery of the adhesive material as viewed from the surface of the first substrate includes a zone which is constituted of a plurality of first portions passing substantially the same position as an outer periphery of the surface of the first substrate and a plurality of second portions each of which is connected with the two neighboring first portions and has a center portion thereof in a peripheral direction retracted toward an inner peripheral side of the adhesive material as viewed from the surface of the first substrate.

12 Claims, 19 Drawing Sheets

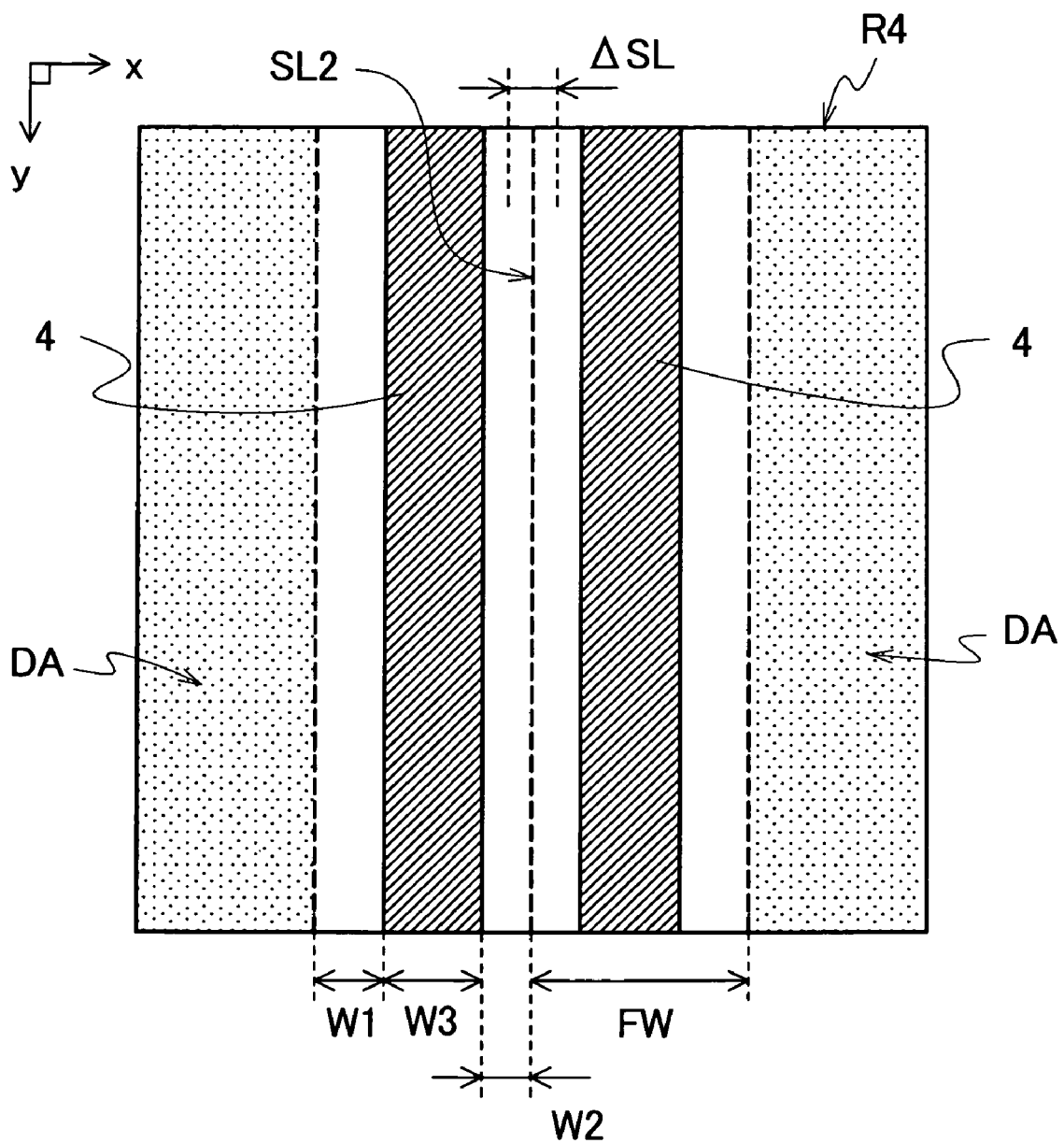

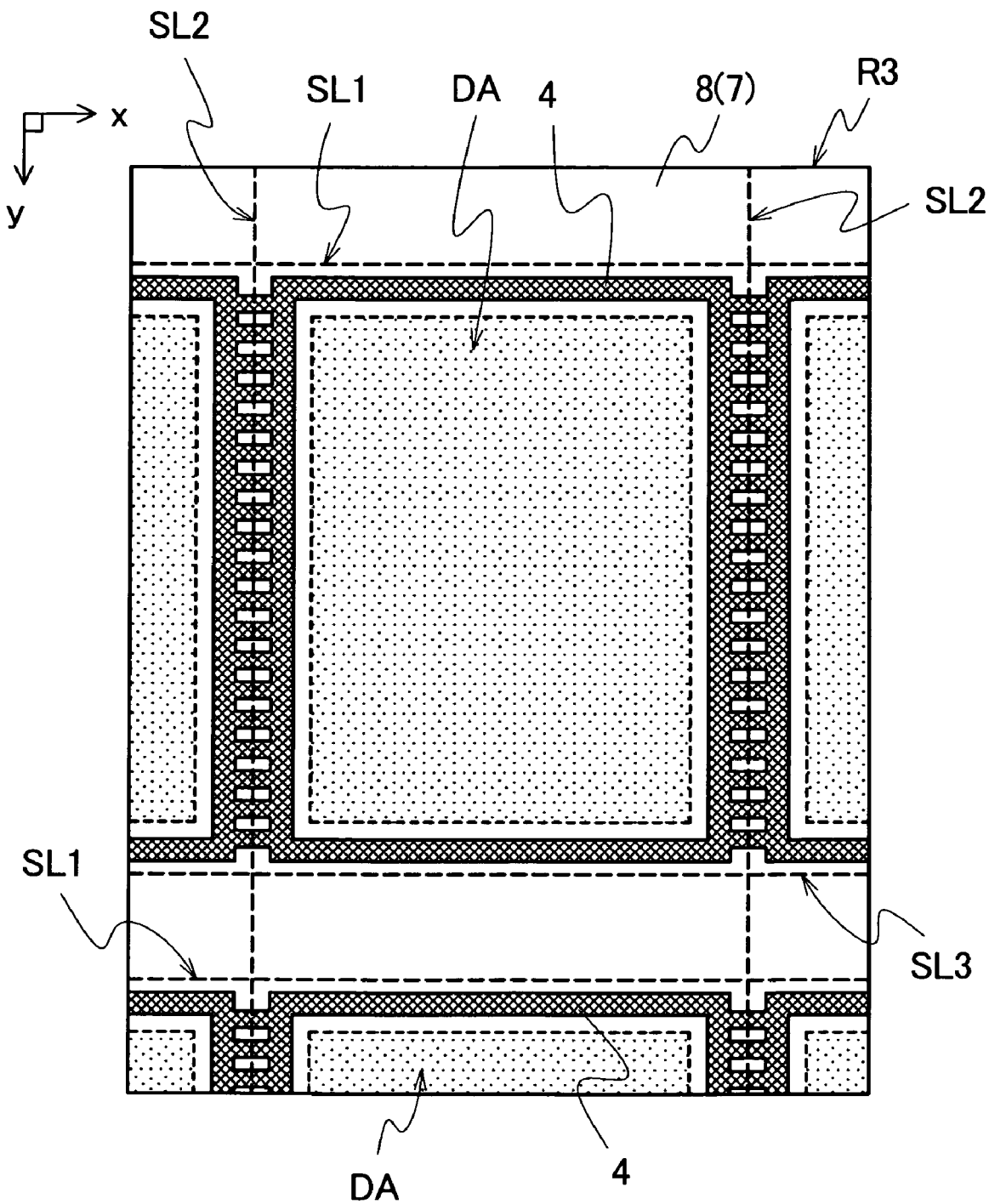

DISPLAY DEVICE WITH SUFFICIENT ADHESIVE STRENGTH FOR SEALING MATERIAL

CLAIM OF PRIORITY

The present application claims priority from Japanese application serial No. 2008-32563, filed on Feb. 14, 2008, the content of which is hereby incorporated by reference into this application.

BACKGROUND OF THE INVENTION

1. Field of the Invention

The present invention relates to a display device, and more particularly to a technique which is effectively applicable to a TFT-type liquid crystal display device.

2. Description of the Related Art

Conventionally, the TFT-type liquid crystal display device has been used as a display of portable electronic equipment such as a mobile phone terminal, an external display of a television receiver set, a personal computer (PC) or the like.

The TFT-type liquid crystal display device is a display device which includes a TFT liquid crystal display panel in which a liquid crystal material is filled between a pair of substrates. Here, the pair of substrates is adhered to each other using an annular sealing material (adhesive material), and the liquid crystal material is hermetically filled in a space defined by the pair of substrates and the sealing material.

In manufacturing the liquid crystal display panels, the liquid crystal display panels are manufactured by a method which is referred to as a "multi-piece simultaneously forming method" using a large area of mother glass in general. In manufacturing the liquid crystal display panels by the multi-piece simultaneously forming method, a first mother glass from which only a large number of substrates each of which constitutes one of the pair of substrates are formed and a second mother glass from which only a large number of substrates each of which constitutes the other of the pair of substrates are formed are adhered to each other using the sealing material and, thereafter, the first mother glass and the second mother glass are divided into the individual liquid crystal display panels by cutting.

Here, a method of filling a liquid crystal material is roughly classified into a method of filling a liquid crystal material in a state where two mother glasses are adhered to each other (liquid-crystal dropping filling method (ODF method)) and a method of filling a liquid crystal material after the mother glasses are divided into individual liquid crystal display panels.

SUMMARY OF THE INVENTION

Here, with respect to the liquid crystal display panel, due to steady narrowing of a picture frame, a size of a portion of the substrate outside a display region has been remarkably decreased. Accordingly, a size (a width) of the sealing material whish is formed outside the display region is also decreased.

However, when the width of the sealing material becomes small, an adhering surface between the sealing material and the substrate becomes narrow. Accordingly, for example, a sufficient adhesive strength cannot be obtained thus easily giving rise to a drawback that the substrate is peeled off.

Further, in filling the liquid crystal material by the liquid-crystal dropping filling method, for example, the sealing material is printed on a surface of the first mother glass, the liquid crystal material is dropped, the second mother glass is adhered to the first mother glass, and the sealing material is cured. Accordingly, when a dropping quantity of the liquid crystal material exceeds a predetermined quantity, for example, an excess quantity of liquid crystal material leaks and intrudes into a contact interface (adhering surface) between the second mother glass and the sealing material thus easily giving rise to a drawback that an adhesive strength between the second mother glass and the sealing material is lowered.

The above-mentioned drawbacks are particularly apparent with respect to a miniaturized liquid crystal display panel such as a liquid crystal display panel for a mobile phone terminal, and there has been a demand for countermeasures which can overcome such drawbacks.

Accordingly, it is an object of the invention to provide a technique which can ensure a sufficient adhesive strength on adhering surfaces formed between a pair of respective substrates of a liquid crystal display panel and a sealing material.

The above-mentioned and other objects and novel features of the invention will become apparent by the description of this specification and attached drawings.

To briefly explain the summary of typical inventions among inventions described in this specification, they are as follows.

(1) In a display device which includes: a first substrate on which a predetermined integrated circuit is formed; a second substrate which is arranged on one surface of the first substrate in an overlapping manner; and an adhesive material which is arranged between the first substrate and the second substrate and has an annular planar shape as viewed from the surface of the first substrate, the adhesive material being provided for adhering the first substrate and the second substrate, an outer periphery of the adhesive material as viewed from the surface of the first substrate includes a zone which is constituted of a plurality of first portions passing substantially the same position as an outer periphery of the surface of the first substrate and a plurality of second portions each of which is connected with the two neighboring first portions and has a center portion thereof in a peripheral direction retracted toward an inner peripheral side of the adhesive material as viewed from the surface of the first substrate.

(2) In the display device having the constitution (1), the adhesive material is configured such that a distance between the first portion and an inner periphery of the adhesive material as viewed from the surface of the first substrate is longer than a distance between the center portion of the second portion in the peripheral direction and the inner periphery of the adhesive material as viewed from the surface of the first substrate.

(3) In the display device having the constitution (1) or (2), the surface of the first substrate has an approximately rectangular shape, and the zone exists on portions of the outer periphery of the adhesive material which extend along two respective sides of the outer periphery of the surface of the first substrate which are arranged parallel to each other.

(4) In the display device having the constitution (3), external connection terminals of the integrated circuit are arranged along one side of the outer periphery of the surface of the first substrate, and the zone of the adhesive material exists on portions of the outer periphery of the surface of the first substrate which extend along two respective sides of the first substrate which are connected with the side of the first substrate along which the external connection terminals are arranged.

(5) In the display device having any one of the constitutions (1) to (4), the plurality of second portions exhibits a substantially same retracting quantity from the outer periphery of the first substrate at the center portion of the second portion in the peripheral direction.

(6) In the display device having any one of the constitutions (1) to (4), the two neighboring second portions differ from each other in a retracting quantity thereof from the outer periphery of the first substrate at the center portion in the peripheral direction.

(7) In the display device having any one of the constitutions (1) to (6), a size of the first portion in the peripheral direction and a size of the second portion in the peripheral direction are substantially equal to each other.

(8) In the display device having any one of the constitutions (1) to (6), a size of the first portion in the peripheral direction is set larger than a size of the second portion in the peripheral direction.

(9) In the display device having any one of the constitutions (1) to (8), the adhesive material is a photo-curing resin.

(10) In the display device having any one of the constitutions (1) to (9), the adhesive material has a closed annular planar shape as viewed from the surface of the first substrate.

(11) In the display device having any one of the constitutions (1) to (9), the adhesive material has an open annular planar shape as viewed from the surface of the first substrate.

(12) In the display device having any one of the constitutions (1) to (11), the display panel is a liquid crystal display panel in which a liquid crystal material is filled between the first substrate and the second substrate.

According to the display device of the invention, an area of the adhesive interface between the first substrate and the adhesive member (sealing material) and an area of the adhesive interface between the second substrate and the adhesive member in the zone of the adhesive material can be increased and hence, it is possible to ensure a sufficient adhesive strength. Accordingly, it is possible to reduce peeling of the adhering surface between the first substrate and the adhesive material and peeling of the adhering surface between the second substrate and the adhesive material.

Further, according to the display device of the invention, by forming the second portions in the zone of the adhesive material, it is possible to reduce cutting failures when the sides of the first substrate and the second substrate along which the zone of the adhesive material extends are cut.

BRIEF DESCRIPTION OF THE DRAWINGS

FIG. 3 is a schematic front view for explaining drawbacks of the conventional liquid crystal display panel;

FIG. 4C is a schematic front view showing a region which is cut out as one piece of liquid crystal display panel and one example of the planar shape of the sealing material on a periphery of the region;

DESCRIPTION OF THE PREFERRED EMBODIMENTS

Hereinafter, embodiments of the invention are explained in detail in conjunction with attached drawings.

In all drawings for explaining the embodiments, parts having identical functions are given same symbols and their repeated explanation is omitted.

Figure 1A:
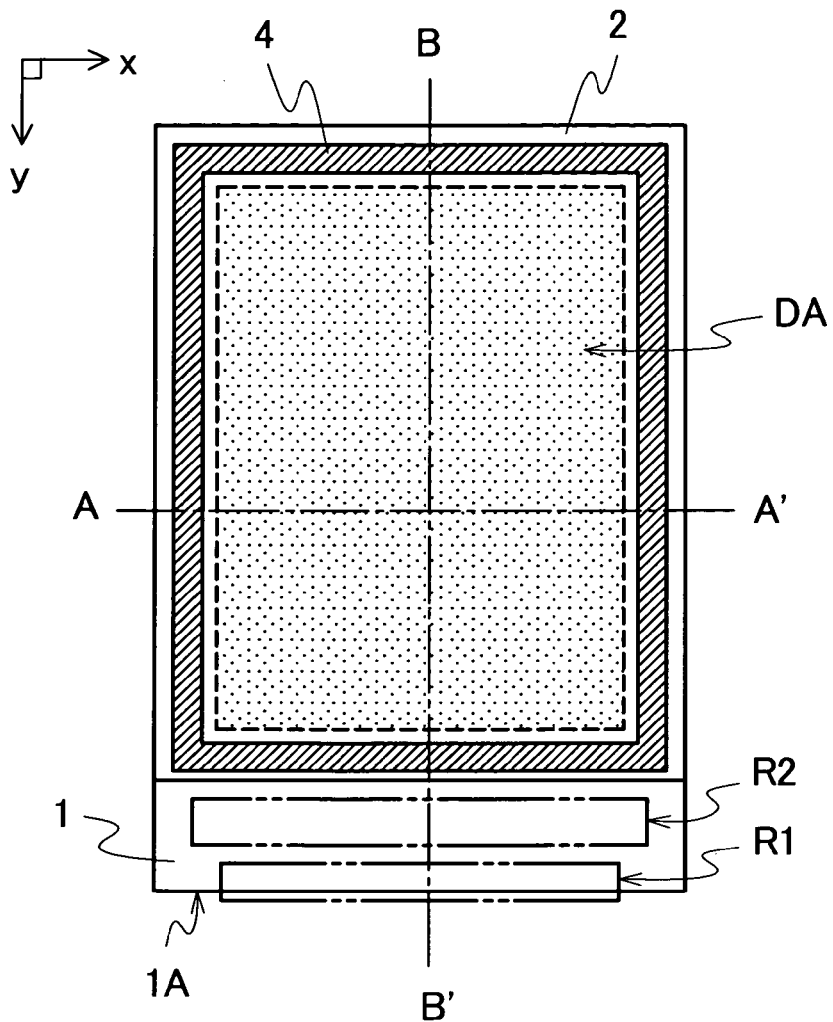
FIG. 1A is a schematic front view showing one example of the schematic constitution of a conventional liquid crystal display panel.
Figure 1B:
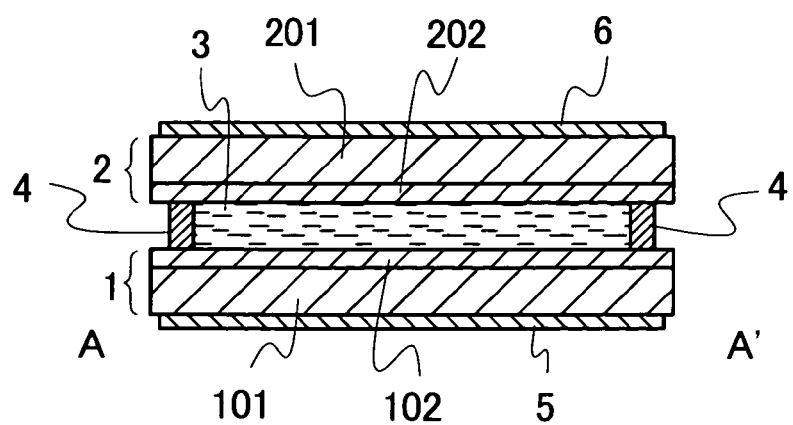
FIG. 1B is a schematic cross-sectional view showing one example of the cross-sectional constitution taken along a line A-A' in FIG. 1A.
Figure 1C:
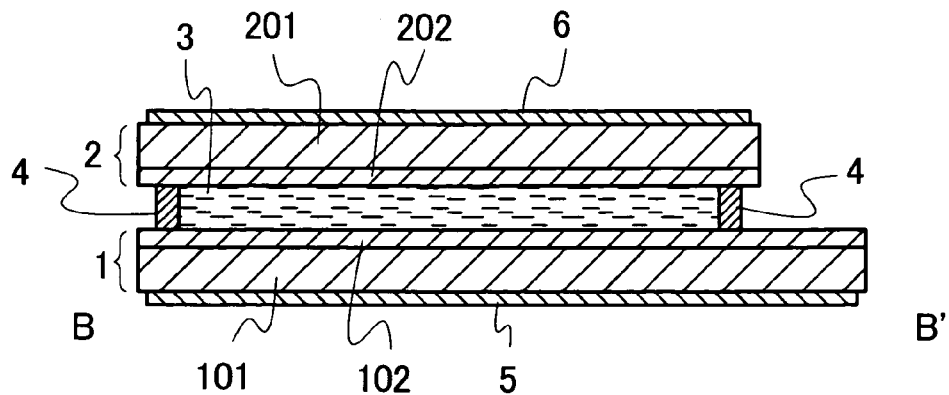
FIG. 1C is a schematic cross-sectional view showing one example of the cross-sectional constitution taken along a line B-B' in FIG. 1A.

FIG. 1A to FIG. 1C are schematic views showing one example of the schematic constitution of a conventional display panel which is provided for explaining a display panel according to the invention.

FIG. 1A is a schematic front view showing one example of the schematic constitution of the conventional liquid crystal display panel. FIG. 1B is a schematic cross-sectional view showing one example of the cross-sectional constitution taken along a line A-A' in FIG. 1A. FIG. 1C is a schematic cross-sectional view showing one example of the cross-sectional constitution taken along a line B-B' in FIG. 1A.

The invention is applicable to, for example, a miniaturized liquid crystal display panel used in a liquid crystal display of a mobile phone terminal. The liquid crystal display panel used in the liquid crystal display of a conventional mobile phone terminal includes, for example, as shown in FIG. 1A to FIG. 1C, a TFT substrate 1, a counter substrate 2, a liquid crystal material 3, a sealing material (adhesive material) 4, a lower polarizer 5 and an upper polarizer 6.

The TFT substrate 1 includes, for example, an integrated circuit forming layer 102 on a surface (a surface facing the counter substrate 2) of an insulation substrate 101 formed of a glass substrate or the like. On the integrated circuit forming layer 102, for example, a plurality of scanning signal lines, a plurality of video signal lines, TFT elements, pixel electrodes, an alignment film and the like are formed. Further, in a region R1 of the TFT substrate 1 along one side 1A of the TFT substrate 1, for example, external connection terminals for inputting signals which are applied to the plurality of scanning signal lines, the plurality of video signal lines and the like are arranged. Further, in a region R2 of the TFT substrate 1, for example, semiconductor chips such as driver ICs are mounted.

The counter substrate 2 includes, for example, a thin film layer 202 on a surface (a surface facing the TFT substrate 1) of an insulation substrate 201 formed of a glass substrate or the like. On the thin film layer 202, for example, a light blocking film (referred to as a black matrix in general) which divides a display region DA into individual pixel regions, color filters, an alignment film and the like are formed.

Here, the combination of the constitution of the integrated circuit forming layer 102 of the TFT substrate 1 and the constitution of the thin film layer 202 of the counter substrate 2 in the liquid crystal display panel according to the invention may take any combination. That is, in the liquid crystal display panel according to the invention, a counter electrode which forms a pair with the pixel electrode in driving the liquid crystal material 3 may be formed on the integrated circuit forming layer 102 or may be formed on the thin film layer 202. Further, in the liquid crystal display panel according to the invention, the TFT element may adopt the bottom gate structure in which a semiconductor layer is arranged on a gate electrode as viewed from the insulation substrate 101, or the top gate structure in which the gate electrode is arranged above the semiconductor layer as viewed from the insulation substrate 101.

The sealing material 4 is provided for hermetically sealing the liquid crystal material 3 in a space defined between the TFT substrate 1 and the counter substrate 2. A planar shape of the sealing material 4 when the liquid crystal display panel is viewed from a front side thereof is formed in a closed annular shape which surrounds the display region DA as shown in FIG. 1A, for example. Further, the sealing material 4 is, for example, made of a photo-curing resin or a thermosetting resin, and is adhered to a surface of the TFT substrate 1 and a surface of the counter substrate 2.

Further, when the liquid crystal display panel is a transmissive liquid crystal display panel or a transflective liquid crystal display panel, for example, as shown in FIG. 1B and FIG. 1C, the lower polarizer 5 is adhered to a back surface (a back surface of a surface facing the counter substrate 2) of the TFT substrate 1, and the upper polarizer 6 is adhered to a back surface (a back surface of a surface facing the TFT substrate 1) of the counter substrate 2. Further, although not shown in FIG. 1B and FIG. 1C, a one-layered or a plural-layered phase difference sheet may be interposed between the TFT substrate 1 and the lower polarizer 5 as well as between the counter substrate 2 and the upper polarizer 6.

On the other hand, when the liquid crystal display panel is a reflective liquid crystal display panel, the lower polarizer 5 is unnecessary, and a reflective film is formed on the integrated circuit forming layer 102 in place of the lower polarizer 5, for example.

Figure 2A:
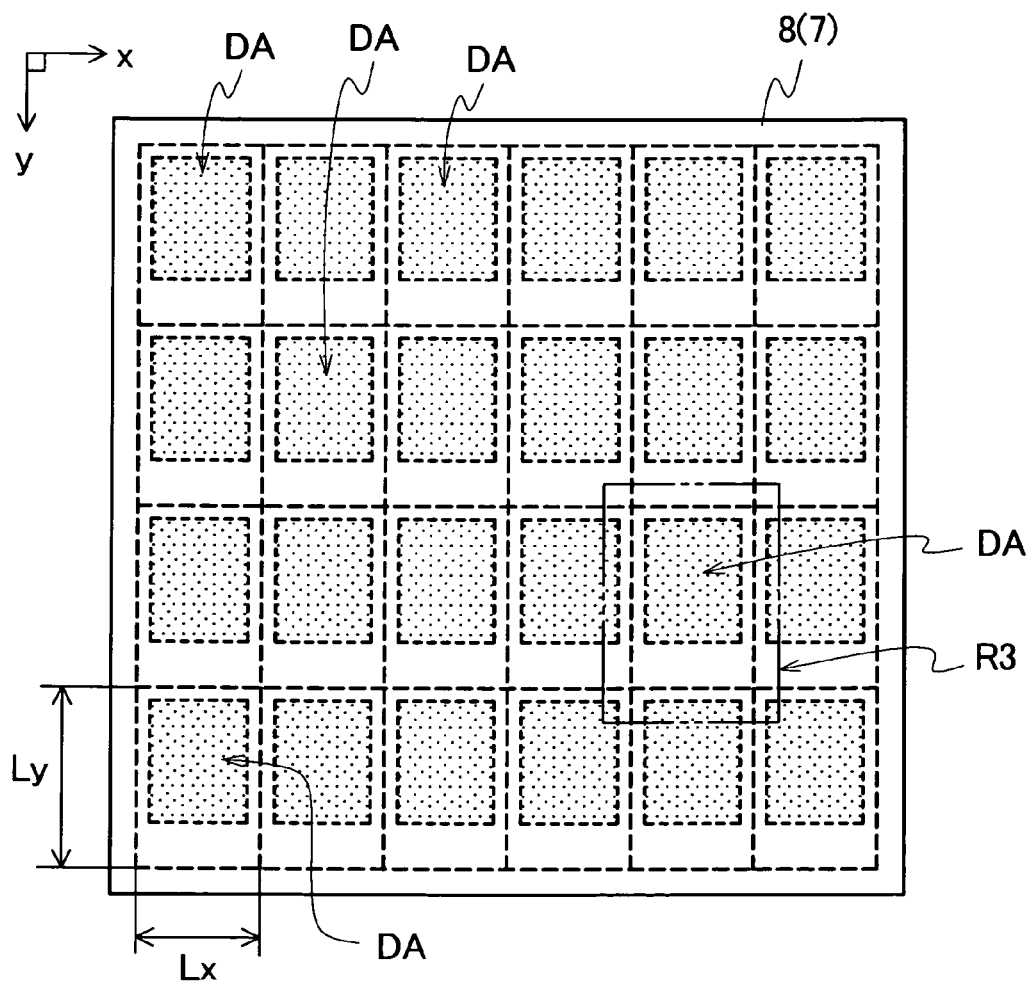
FIG. 2A is a schematic front view showing one example of a manufacturing method of liquid crystal display panels by a multi-piece simultaneously forming method.
Figure 2B:
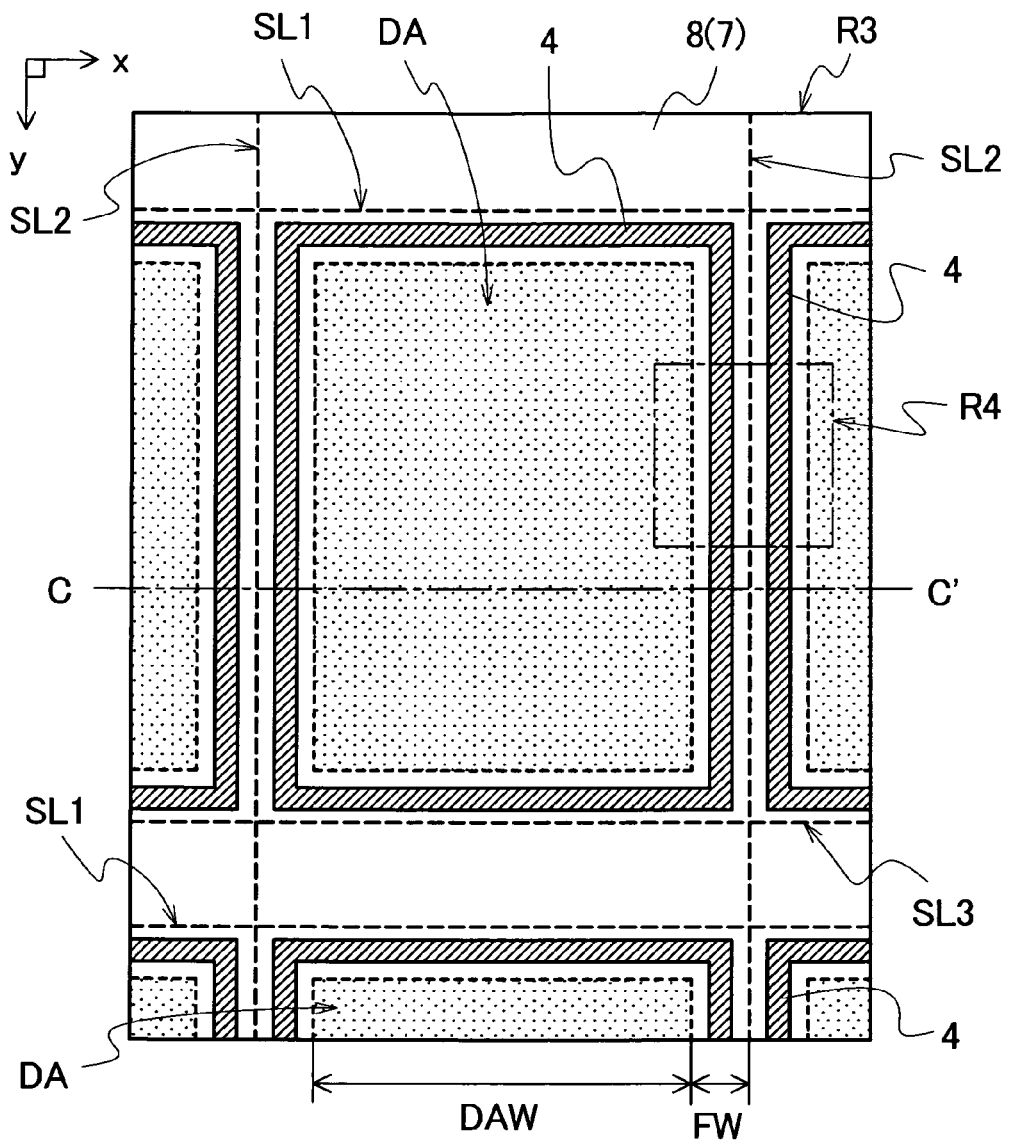
FIG. 2B is a schematic enlarged front view showing a region R3 in FIG. 2A in an enlarged manner.
Figure 2C:
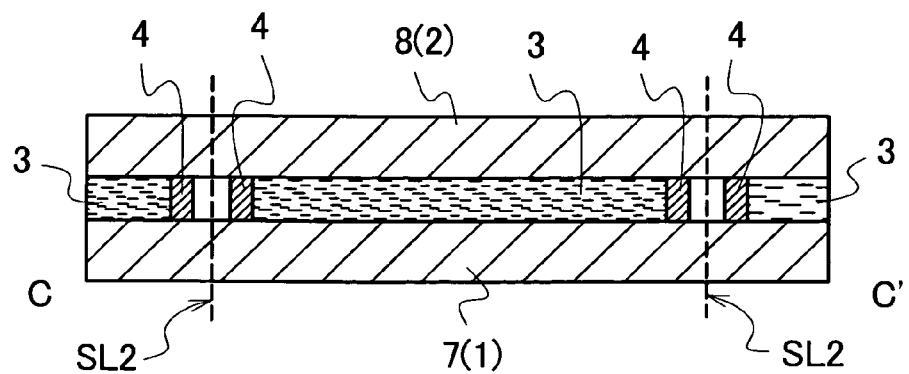
FIG. 2C is a schematic cross-sectional view showing one example of the cross-sectional constitution taken along a line C-C' in FIG. 2B.

FIG. 2A to FIG. 2C are schematic views showing one example of a manufacturing method of the liquid crystal display panels according to the invention.

FIG. 2A is a schematic front view showing one example of the manufacturing method of liquid crystal display panels by a multi-piece simultaneously forming method. FIG. 2B is a schematic enlarged front view showing a region R3 in FIG. 2A in an enlarged manner. FIG. 2C is a schematic cross-sectional view showing one example of the cross-sectional constitution taken along a line C-C' in FIG. 2B.

The x direction and the y direction in FIG. 2A and FIG. 2B are respectively equal to the x direction and the y direction in FIG. 1A.

With respect to the liquid crystal display panel according to the invention, for example, in manufacturing a miniaturized liquid crystal display panel used in a liquid crystal display of a mobile phone terminal or the like, usually, the liquid crystal display panels are manufactured by a method which is referred to as "multi-piece simultaneously forming method". In manufacturing the liquid crystal display panels by the multi-piece simultaneously forming method, a first mother glass 7 from which a plurality of TFT substrates 1 can be formed and a second mother glass 8 from which a plurality of counter substrates 2 can be formed are adhered to each other using the sealing material 4 and, thereafter, the first mother glass 7 and the second mother glass 8 are cut so as to divide these mother glasses 7, 8 into individual liquid crystal display panels.

That is, in the 24-piece simultaneously forming method which manufactures 24 pieces of liquid crystal display panels using the pair of mother glasses, for example, as shown in FIG. 2A to FIG. 2C, when the first mother glass 7 and the second mother glass 8 are adhered to each other using the sealing material 4, 24 pieces of liquid crystal display panels are formed in a state that these liquid crystal display panels are connected with each other with six pieces of liquid crystal display panels extending in the x direction and four pieces of liquid crystal display panels extending in the y direction. Then, when the first mother glass 7 and the second mother glass 8 are cut at portions thereof (cutting lines SL1, SL2) where a bold broken line passes, 24 pieces of liquid crystal display panels having a size Lx in the x direction and a size Ly in the y direction can be obtained from one set of mother glasses 7, 8. Further, the second mother glass 8 (counter substrate 2) is, for example, cut along a cutting line SL3 shown in FIG. 2B so as to expose a region where the external connection terminals of the TFT substrate 1 are arranged or a region where semiconductor chips are mounted.

The example shown in FIG. 2A to 2C is one example of a case in which a liquid crystal material is filled by a liquid crystal dropping sealing method (ODF method). To briefly explain the manufacturing method of liquid crystal display panels which adopts the liquid crystal dropping sealing method, first of all, for example, in the respective regions of the first mother glass 7 for forming 24 pieces of TFT substrate 1 which are cut out as the TFT substrates 1 respectively, the closed annular sealing material 4 (adhesive material) which surrounds the display region DA is formed. Here, the sealing material 4 is formed by printing an uncured photo-curing resin or an uncured thermosetting resin.

Next, the liquid crystal material 3 is dropped in each region which is surrounded by the sealing material 4 formed on the region of the first mother glass 7 to be cut out as the TFT substrate 1.

Next, for example, the second mother glass 8 is arranged on the first mother glass 7 and the sealing material 4 is cured thus adhering the first mother glass 7 and the sealing material 4 to each other and, at the same time, adhering the second mother glass 8 and the sealing material 4 to each other. This step is carried out in a vacuum atmosphere, for example. Here, when the sealing material 4 is made of a photo-curing resin, a light having a predetermined wavelength (for example, ultra violet lays) is radiated to the sealing material 4 so as to cure the sealing material 4, while when the sealing material 4 is made of a thermosetting resin, the sealing material 4 is heated at a predetermined temperature so that the sealing material is cured.

The example shown in FIG. 2A to FIG. 2C is only an example of the case in which the liquid crystal display panels are manufactured by a multi-piece simultaneously forming method. That is, in actually manufacturing the liquid crystal display panels by the multi-piece simultaneously forming method, the number of the liquid crystal display panels is not limited to 24, and the larger number of (for example, 416 pieces of) liquid crystal display panels may be manufactured from the pair of mother glasses 7, 8.

Further, in the example shown in FIG. 2B, a size of an outer peripheral portion (a picture frame portion) of the display region DA in the region to be cut out as one piece of liquid crystal display panel, for example, a distance FW between a right-side edge of the display region and the cutting line is depicted as if the distance has a large size. However, the distance FW between the right-side edge of the display region DA and the cutting line in an actual liquid crystal display panel is extremely small compared to a size DAW of the display region DA in the x direction. Particularly, in case of a miniaturized liquid crystal display panel used in a mobile-phone terminal or the like, there exists a tendency that the size (the distance FW) of the picture frame portion is decreased, and the size (the distance FW) is, for example, merely approximately 1.35 mm. Further, it is necessary to form the sealing material 4 in the picture frame portion having such a size of approximately 1.35 mm.

FIG. 3 is a schematic front view for explaining drawbacks of the conventional liquid crystal display panel.

FIG. 3 is a schematic enlarged front view in which a region R4 in FIG. 2B is enlarged. Further, the x direction and the y direction shown in FIG. 3 are respectively equal to the x direction and the y direction in FIG. 2B.

In the conventional manufacturing method of liquid crystal display panels by the multi-piece simultaneously forming method, the sealing material 4 is, for example, as shown in FIG. 3, formed between the cutting line SL and an edge portion of the display region DA (a picture frame portion). In case of the liquid crystal display panel used in the mobile phone terminal, the distance FW between the cutting line SL2 and the edge portion of the display region DA is, as previously described, approximately 1.35 mm, for example.

Further, in forming the sealing material 4, to prevent the sealing material 4 from projecting from the display region DA after curing, the sealing material 4 is formed such that a distance W1 between an inner periphery of the sealing material 4 and the edge portion of the display region DA becomes approximately 0.4 mm, for example.

Further, as shown in FIG. 2A to 2C and FIG. 3, in dividing portions of the pair of mother glasses corresponding to two pieces of neighboring liquid crystal display panels into two liquid crystal display panels by cutting along one cutting line SL1 (or SL2), it is necessary to take the cutting tolerance ΔSL into consideration. Accordingly, in forming the sealing material 4, for example, a distance W2 between an outer periphery of the sealing material 4 and the cutting line SL2 in each liquid crystal display panel is set larger than a value of one half of the cutting tolerance ΔSL.

In forming the sealing material 4 which satisfies the above-mentioned condition, a size W3 of the sealing material 4 in the x direction in FIG. 3 becomes approximately 0.85 mm, for example. Further, although not shown in the drawing, a size of the sealing material 4 in the direction perpendicular to the cutting line SL1 (or SL2) in other portion of the sealing material 4 also becomes approximately 0.85 mm.

Accordingly, in the conventional liquid crystal display panel, the picture frame portion becomes narrow and, at the same time, an area of an adhering surface between the TFT substrate 1 and the sealing material 4 and an area of an adhering surface between the counter substrate 2 and the sealing material 4 become small thus making it difficult to ensure a sufficient adhesive strength. Accordingly, in the liquid crystal display panel used in the mobile phone terminal, for example, the adhering surface between the TFT substrate 1 and the sealing material 4 is easily peeled and, at the same time, the adhering surface between the counter substrate 2 and the sealing material 4 is easily peeled.

Further, in sealing the liquid crystal material by a liquid crystal dropping sealing method, when a quantity of liquid crystal material 3 dropped in a region surrounded by one sealing material 4 exceeds a predetermined quantity, when the first mother glass 7 and the second mother glass 8 are adhered to each other, an excess quantity of liquid crystal material 3 intrudes into a contact interface between the second mother glass 8 and the sealing material 4, for example. In this case, the area of the adhering surface between the second mother glass 8 (counter substrate 2) and the sealing material 4 is further decreased and hence, the adhering surface between the counter substrate 2 and the sealing material 4 is more easily peeled off.

Specific Embodiment

FIG. 4A to FIG. 4G are schematic views for explaining one specific embodiment of the manufacturing method of the liquid crystal display panels according to the invention.

Figure 4A:
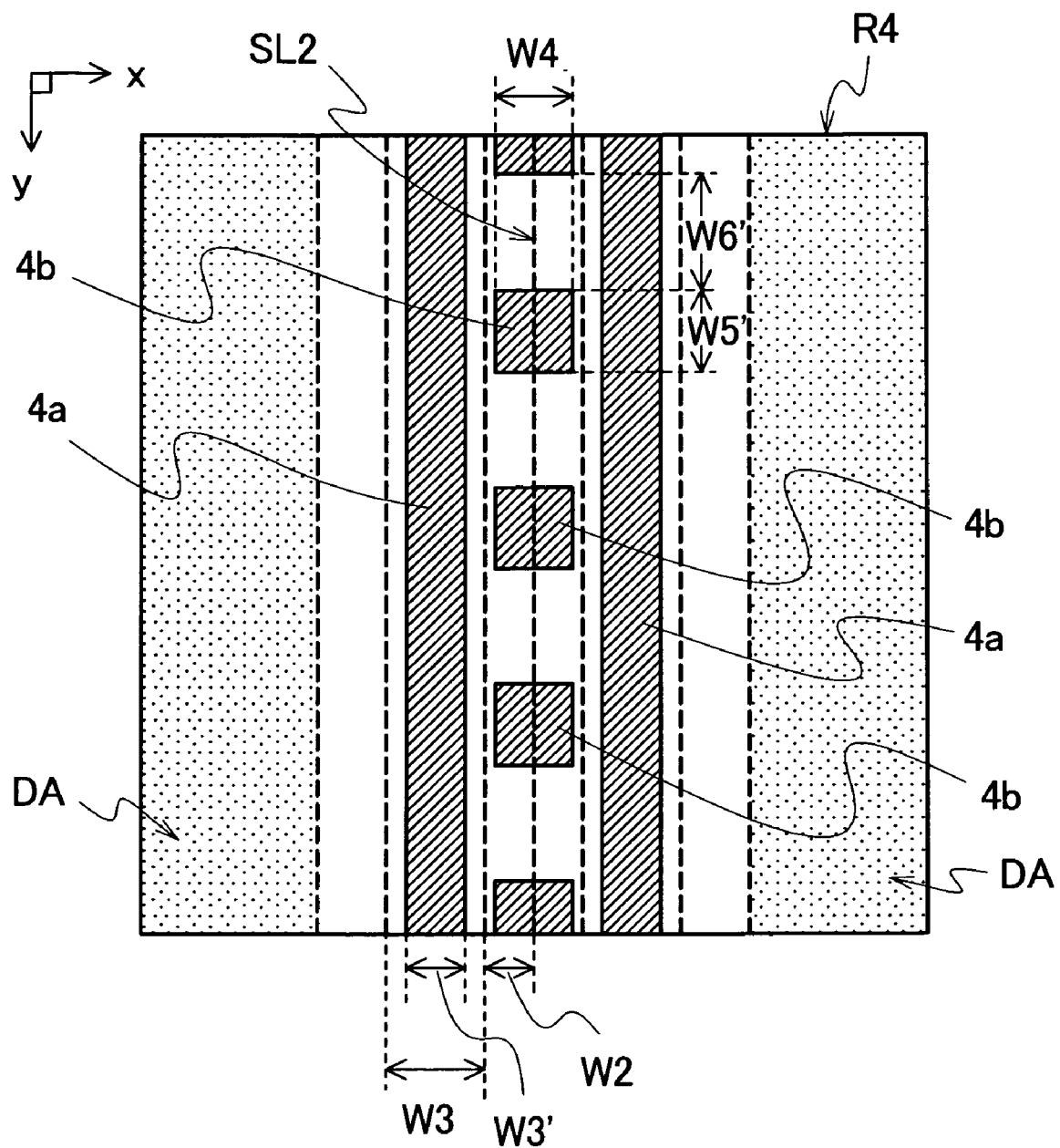
FIG. 4A is a schematic front view showing one example of a printing method of a sealing material in the manufacturing method of liquid crystal display panels of one specific embodiment according to the invention.
Figure 4B:
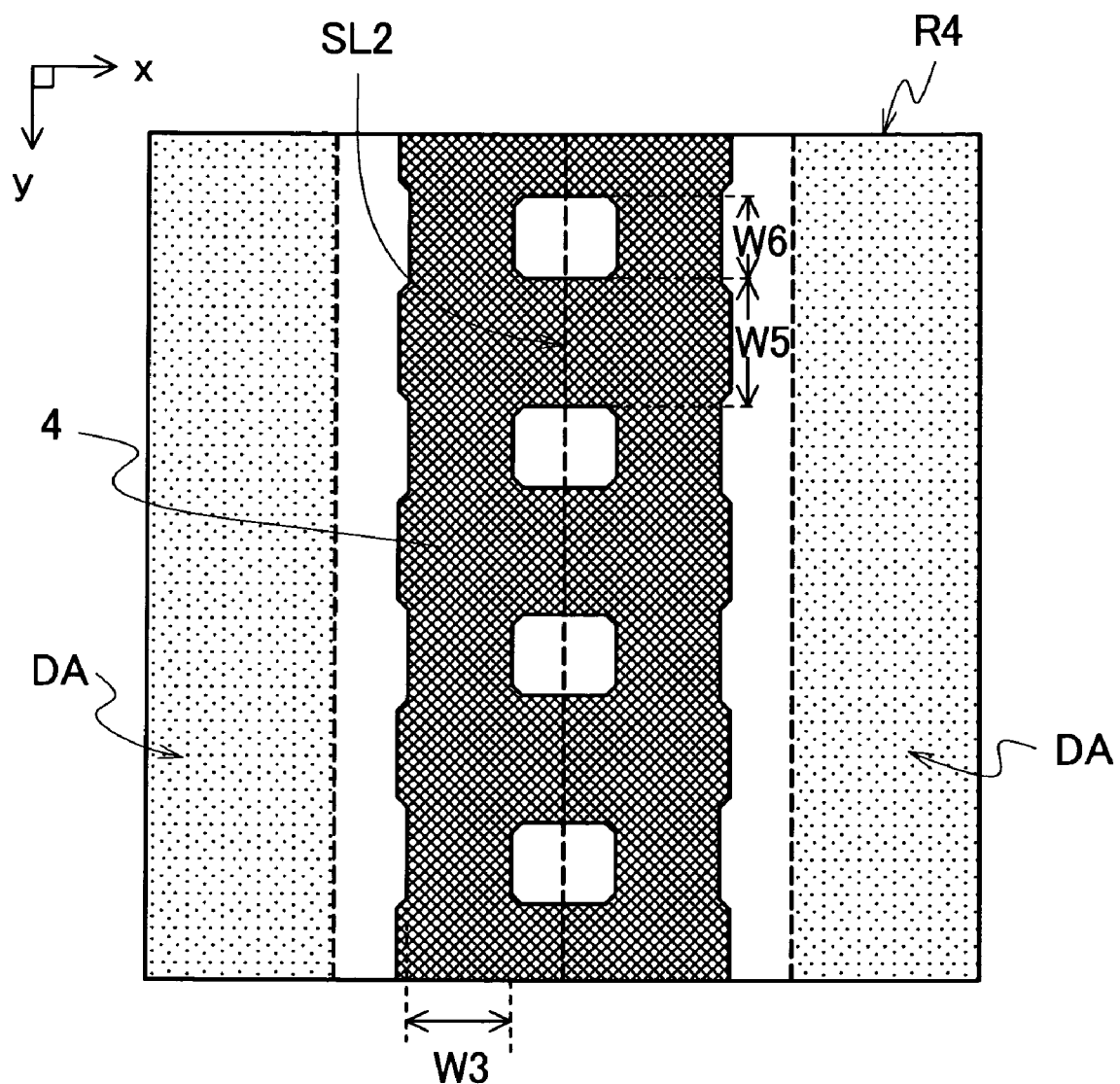
FIG. 4B is a schematic enlarged front view showing one example of a planar shape of the sealing material after the pair of mother glasses of this embodiment is adhered to each other.
Figure 4D:
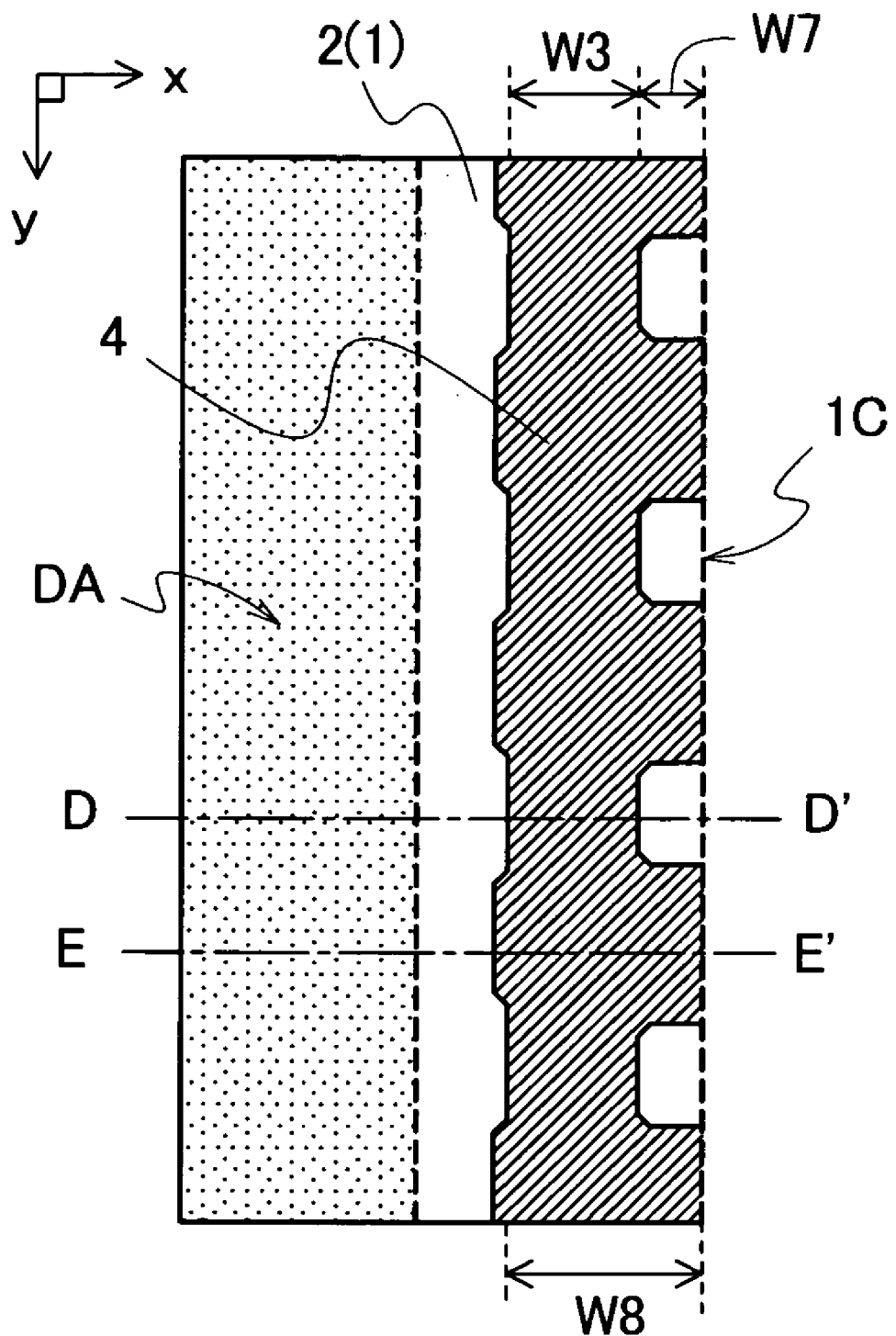
FIG. 4D is a schematic enlarged front view showing one example of the constitution of an outer peripheral portion of the liquid crystal display panel obtained by the manufacturing method of this embodiment.
Figure 4E:
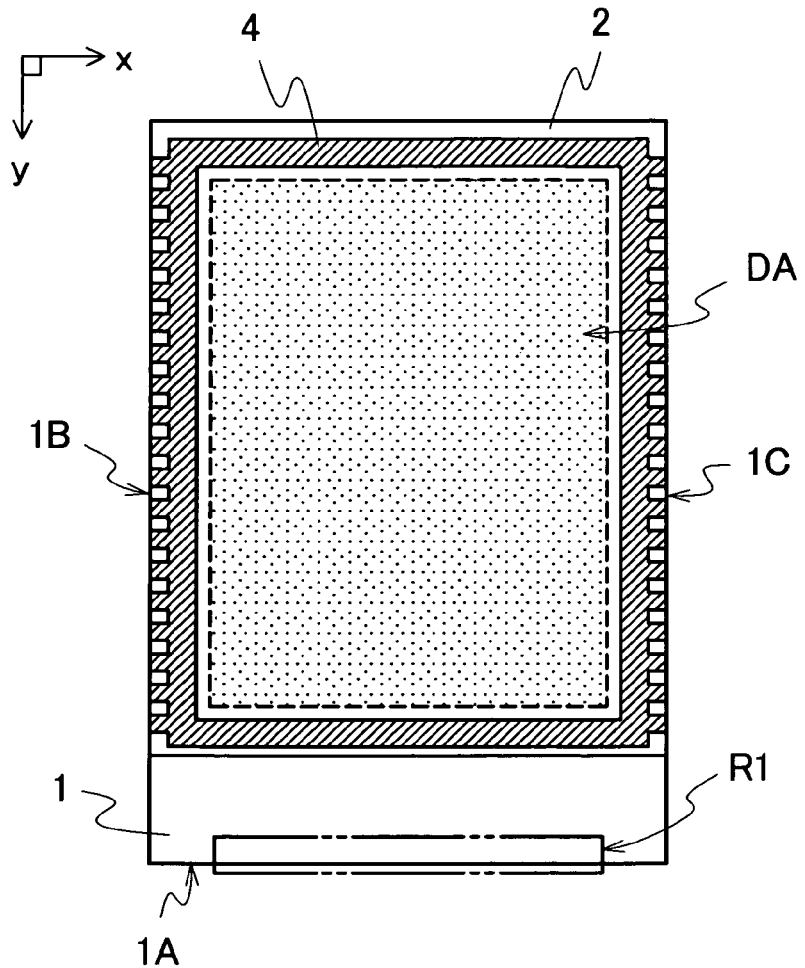
FIG. 4E is a schematic front view showing one example of the planar constitution of one piece of liquid crystal display panel cut out from the mother glass.
Figure 4F:
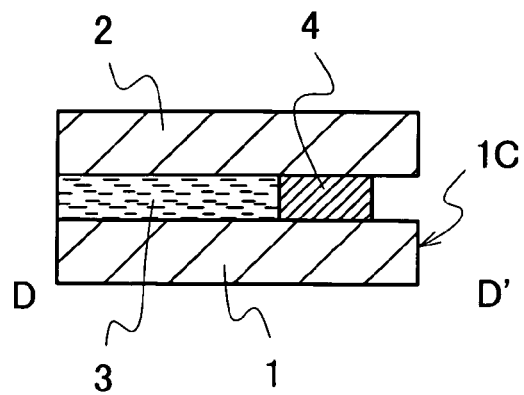
FIG. 4F is a schematic cross-sectional view showing one example of the cross-sectional constitution taken along a line D-D' in FIG. 4D.
Figure 4G:
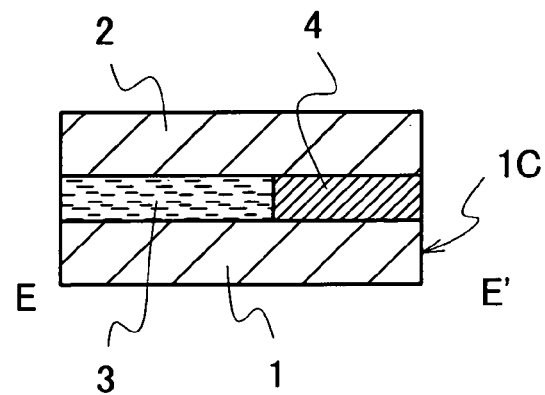
FIG. 4G is a schematic cross-sectional view showing one example of the cross-sectional constitution taken along a line E-E' in FIG. 4D.

FIG. 4A is a schematic front view showing one example of a printing method of the sealing material in the manufacturing method of liquid crystal display panels of one specific embodiment according to the invention. FIG. 4B is a schematic enlarged front view showing one example of a planar shape of the sealing material after the pair of mother glasses of this embodiment is adhered to each other. FIG. 4C is a schematic front view showing a region which is cut out as one piece of liquid crystal display panel and one example of the planar shape of the sealing material on a periphery of the region. FIG. 4D is a schematic enlarged front view showing one example of the constitution of an outer peripheral portion of the liquid crystal display panel obtained by the manufacturing method of this embodiment. FIG. 4E is a schematic front view showing one example of the planar constitution of one piece of liquid crystal display panel cut out from the mother glass. FIG. 4F is a schematic cross-sectional view showing one example of the cross-sectional constitution taken along a line D-D' in FIG. 4D. FIG. 4G is a schematic cross-sectional view showing one example of the cross-sectional constitution taken along a line E-E' in FIG. 4D.

Further, FIG. 4A and FIG. 4B show the planar constitution of a region corresponding to the region R4 shown in FIG. 2B. Further, FIG. 4C shows the planar constitution of a region corresponding to a region R3 in FIG. 2A. FIG. 4D shows a region on a left side of a cutting line in FIG. 4B which is the schematic enlarged front view. FIG. 4E shows a liquid crystal display panel which is formed by cutting out a center portion in FIG. 4C which is the schematic front view.

Further, the x direction and the y direction in FIG. 4A to FIG. 4E are respectively equal to the x direction and the y direction shown in FIG. 2B.

The general steps of the manufacturing method of liquid crystal display panels according to the invention are equal to the steps of the conventional manufacturing method of liquid crystal display panels. Accordingly, in this embodiment, only points which make the manufacturing method of the liquid crystal display panels of the invention differ from the conventional manufacturing method of the liquid crystal display panels are explained. Further, in this embodiment, as the conventional manufacturing method of liquid crystal display panels, the manufacturing method which seals the liquid crystal material 3 by a liquid crystal dropping sealing method is exemplified.

In the manufacturing method of liquid crystal display panels according to this embodiment, first of all, the pair of mother glasses, that is, the first mother glass 7 from which plural pieces of TFT substrates 1 can be formed and the second mother glass 8 from which plural pieces of counter substrates 2 can be formed is prepared. With respect to the combination of the constitution of the TFT substrate 1 on the first mother glass 7 and the constitution of the counter substrate 2 on the second mother glass 8, any one of combinations respectively applied to the conventional liquid crystal display panels may be selected. Further, with respect to the manufacturing method of the first mother glass 7 and the manufacturing method of the second mother glass 8, any one of methods which are adopted by the conventional manufacturing method of liquid crystal display panels may be selected in conformity with the constitution of the TFT substrate 1 and the constitution of the counter substrate 2.

Next, the sealing material 4 (adhesive material) is formed on the respective regions which are cut out as the TFT substrates 1 from the first mother glass 7. Here, for example, as shown in FIG. 4A, the sealing material 4 forms, besides an annular sealing material 4a which surrounds the display region DA which is formed also in the conventional manufacturing method, a plurality of island-shaped sealing materials 4b which passes between the sealing materials 4a formed in the regions which are cut out as two neighboring TFT substrates 1 in the x direction. Here, the annular sealing materials 4a and the island-shaped sealing materials 4b are formed by printing an uncured photo curing resin, for example.

Further, a width W3' of the annular sealing material 4a at the timing of the printing is set smaller than a width W3 after curing by taking a spreading amount due to the deformation of the sealing material 4a when the second mother glass 8 is adhered to the first mother glass 7 into consideration. Further, a size W4 of the island-shaped sealing material 4b in the x direction is set to a value which makes the island-shaped sealing material 4b united with the annular sealing materials 4a arranged on both sides of the island-shaped sealing materials 4b due to the deformation of the sealing materials 4a, 4b when the second mother glass 8 is adhered to the first mother glass 7. Although a size W5' of the island-shaped sealing material 4b in the y direction can be arbitrarily set, a gap W6' between two neighboring island-shaped sealing materials 4b is set to a value which prevents two sealing materials 4b from being united with each other when the second mother glass 8 is adhered to the first mother glass 7. Specific examples of these sizes W5', W6' are explained later.

Next, the liquid crystal material 3 is dropped in the inside of each of the annular sealing materials 4a formed in the regions cut out as the TFT substrates 1 from the first mother glass 7.

Next, the second mother glass 8 is adhered to the first mother glass 7, and the sealing materials 4a, 4b are cured. At this point of time, the sealing materials 4a, 4b are deformed due to a dead weight of the second mother glass 8 or a pressure applied from the outside so that the sealing materials 4a, 4b are united with each other and, for example, are cured in a state that these sealing materials 4a, 4b have a planar shape shown in FIG. 4B. That is, the sealing materials 4a, 4b are cured in a state that two annular sealing materials 4a which are formed in the regions cut out as two neighboring TFT substrates 1 in the x direction are connected with each other by the plurality of island-shaped sealing materials 4b formed between two annular sealing materials 4a thus forming the integral sealing material 4. Accordingly, the sizes W4, W5' of the island-shaped sealing material 4 and the gap W6' shown in FIG. 4A are respectively set to values which allow the planar shape of the sealing material 4 when the pair of mother glasses 7, 8 are adhered to each other to assume the shape shown in FIG. 4B. Here, parts to be connected by the island-shaped sealing materials 4b are, for example, two neighboring annular sealing materials 4a in the x direction and hence, in the planar shape of the sealing materials 4 after the pair of mother glasses 7, 8 is adhered to each other, for example, as shown in FIG. 4C, the sealing materials 4 which are respectively formed in the regions cut out as the TFT substrates 1 arranged in the x direction are connected (united) with each other.

Further, the sizes W5', W6' at the time of printing the island-shaped sealing materials 4b are set such that, in the sealing material 4 after the pair of mother glasses 7, 8 is adhered to each other (after curing), a size W5 of a portion in the y direction which connects two annular portions and, a gap W6 between two connected portions (a size of a space portion in the y direction) satisfy the relationship of W5≧W6, for example. Further, the sizes W5', W6' at the time of printing the island-shaped sealing materials 4b are set such that the size W5 of the portion in the y direction which connects two annular portions and the gap W6 between two connected portions respectively take values which are expressed by, for example, 0.1 mm<W5<5.0 mm (more preferably 1.0 mm) and 0.1 mm<W6<5.0 mm (more preferably 1.0 mm).

Further, the step in which the second mother glass 8 is adhered to the first mother glass 7 and the sealing material 4 (4a, 4b) is cured is carried out in a vacuum atmosphere, for example, wherein the second mother glass 8 is stacked on the first mother glass 7, the sealing material 4 (4a, 4b) and the second mother glass 8 are brought into close contact with each other and a gap between the first mother glass 7 and the second mother glass 8 is set to a predetermined value and, thereafter, a light (for example, ultraviolet lays) having a predetermined wave length is radiated to the sealing material 4 so as to cure the sealing material 4.

In this manner, by connecting the annular sealing materials 4a respectively formed in the regions cut out as two neighboring TFT substrates 1 (liquid crystal display panels) in the x direction by the plurality of island-shaped sealing materials 4b, the area of the adhering surface between the first mother glass 7 and the sealing material 4 and the area of the adhering surface between the second mother glass 8 and the sealing material 4 are respectively increased by an amount corresponding to the connecting portions compared to the example shown in FIG. 3, for example. Accordingly, the liquid crystal display panel used in the mobile phone terminal or the like which has the picture frame portion of a small size (width) FW can also increase an adhesive strength between the first mother glass 7 (TFT substrate 1) and the sealing material 4 as well as an adhesive strength between the second mother glass 8 (counter substrate 2) and the sealing material 4.

Further, when the area of the adhering surface between the first mother glass 7 and the sealing material 4 and the area of the adhering surface between the second mother glass 8 and the sealing material 4 are respectively increased by amounts corresponding to the connecting portions, for example, even when a quantity of dropped liquid crystal material 3 exceeds a prescribed value and an excess quantity of the liquid crystal material 3 intrudes between the second mother glass 8 and the sealing material 4, it is possible to ensure a sufficient adhesive strength. Accordingly, peeling of the adhering surface between the first mother glass 7 (TFT substrate 1) and the sealing material 4 attributed to the intrusion of the liquid crystal material 3 and peeling of the adhering surface between the second mother glass 8 (counter substrate 2) and the sealing material 4 attributed to the intrusion of the liquid crystal material 3 can be reduced.

Next, the first mother glass 7 and the second mother glass 8 are cut along the cutting lines SL1, SL2 thus dividing these mother glasses 7, 8 into the individual liquid crystal display panels. Here, a boundary (cutting line SL2) of the regions which are cut out as two neighboring TFT substrates 1 in the x direction exhibits a state in which a portion where the sealing material 4 passes and a portion where the sealing material 4 does not pass are alternately arranged. Accordingly, compared to a case in which the sealing material 4 exists over the whole cutting line SL2, an impact which occurs at the time of cutting the sealing material 4 is small so that, for example, it is possible to prevent the occurrence of cutting failures such as a peeling of the adhering surface between the TFT substrate 1 or the counter substrate 2 and the sealing material 4 attributed to such an impact at the time of cutting.

One piece of liquid crystal display panel obtained by the above-mentioned steps forms, for example, as shown in FIG. 4D to FIG. 4G, on an outer periphery (a side surface) of the sealing material 4 as viewed from a surface of the TFT substrate 1, a zone which is constituted of a plurality of first portions which passes the same position as outer peripheries of the TFT substrate 1 and the counter substrate 2, and a plurality of second portions each of which is connected with two neighboring first portions and has a center portion thereof as viewed in a peripheral direction (y direction) retracted toward an inner peripheral side of the sealing material as viewed from the surface of the TFT substrate 1 by a distance W7. Here, it is desirable that a retracting quantity (distance W7) of the second portion is smaller than a distance W3 between the second portion out of an outer periphery of the sealing material 4 and an inner periphery of the sealing material (W7<W3).

Here, as a matter of course, the above-mentioned zone exists, for example, as shown in FIG. 4E, on portions which respectively extend along a left side 1B and a right side 1C of the TFT substrate 1 which are connected with the side 1A of the TFT substrate 1 on which the external connection terminals are arranged. Further, a distance W8 between the first portion out of the outer periphery of the sealing material 4 and the inner periphery of the sealing material 4 is set larger than the distance W3 between the second portion out of the outer periphery of the sealing material 4 and the inner periphery of the sealing material. That is, with respect to the sealing material 4 of the liquid crystal display panel obtained by the manufacturing method of this embodiment, to focus on the portions which extend respectively along the left side 1B and the right side 1C of the TFT substrate 1 connected to the side 1A of the TFT substrate 1 on which the external connection terminals are arranged, the portion exhibits a shape in which a portion having the width W8 and a portion having the width W3 are alternately arranged.

As has been explained heretofore, the liquid crystal display panel obtained by the manufacturing method of this embodiment can increase the adhesive area between the TFT substrate 1 and the sealing material 4 and the adhesive area between the counter substrate 2 and the sealing material 4 compared to the conventional liquid crystal display panel having the same size as the liquid crystal display panel of this embodiment. Accordingly, the liquid crystal display panel having the picture frame portion of the narrow size FW outside the display region DA also can reduce peeling of the adhering surface between the TFT substrate 1 and the sealing material 4 and peeling of the adhering surface between the counter substrate 2 and the sealing material 4.

Figure 5A:
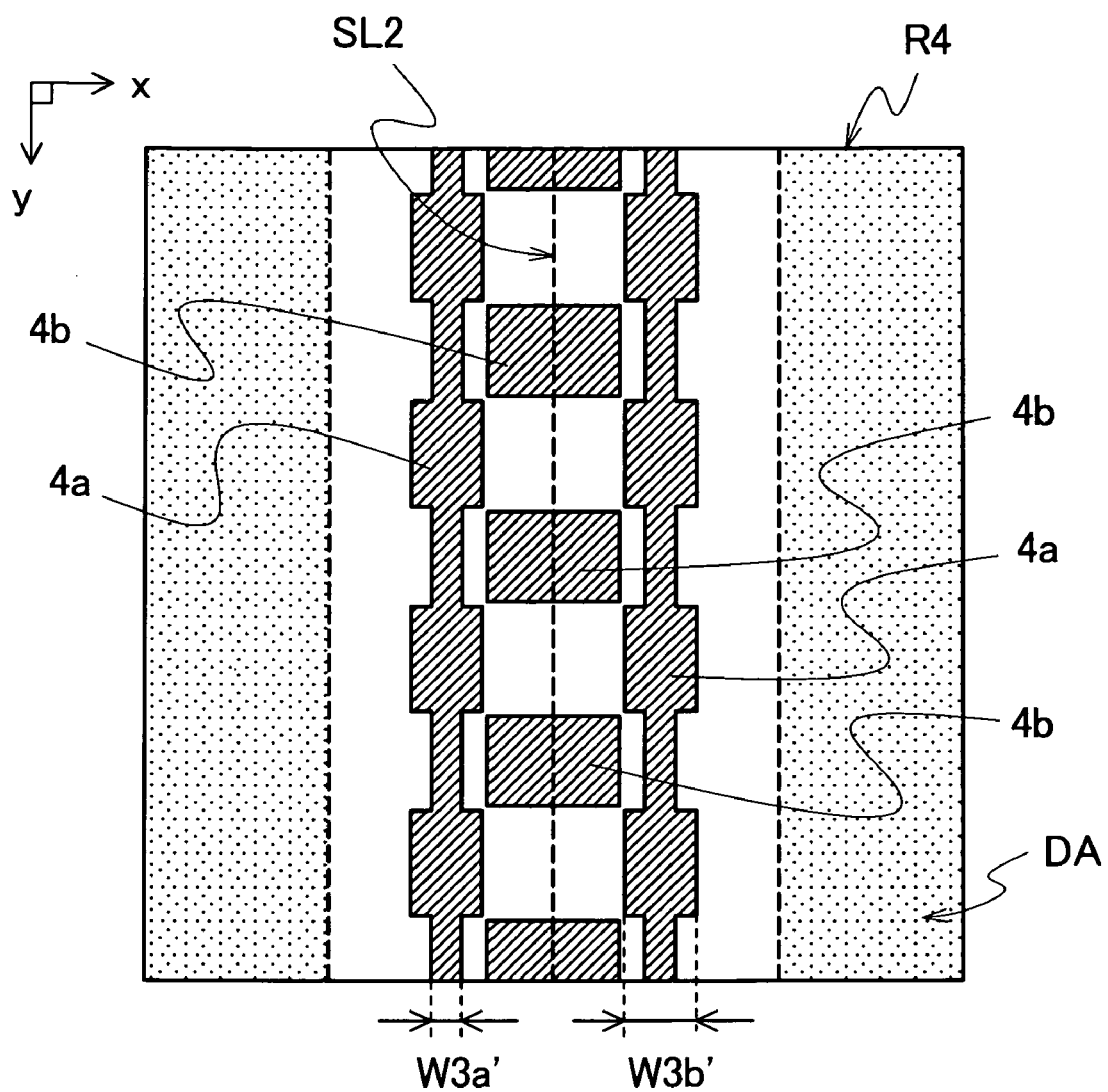
FIG. 5A is a schematic front view showing a first modification of the printing method of the sealing material.
Figure 5B:
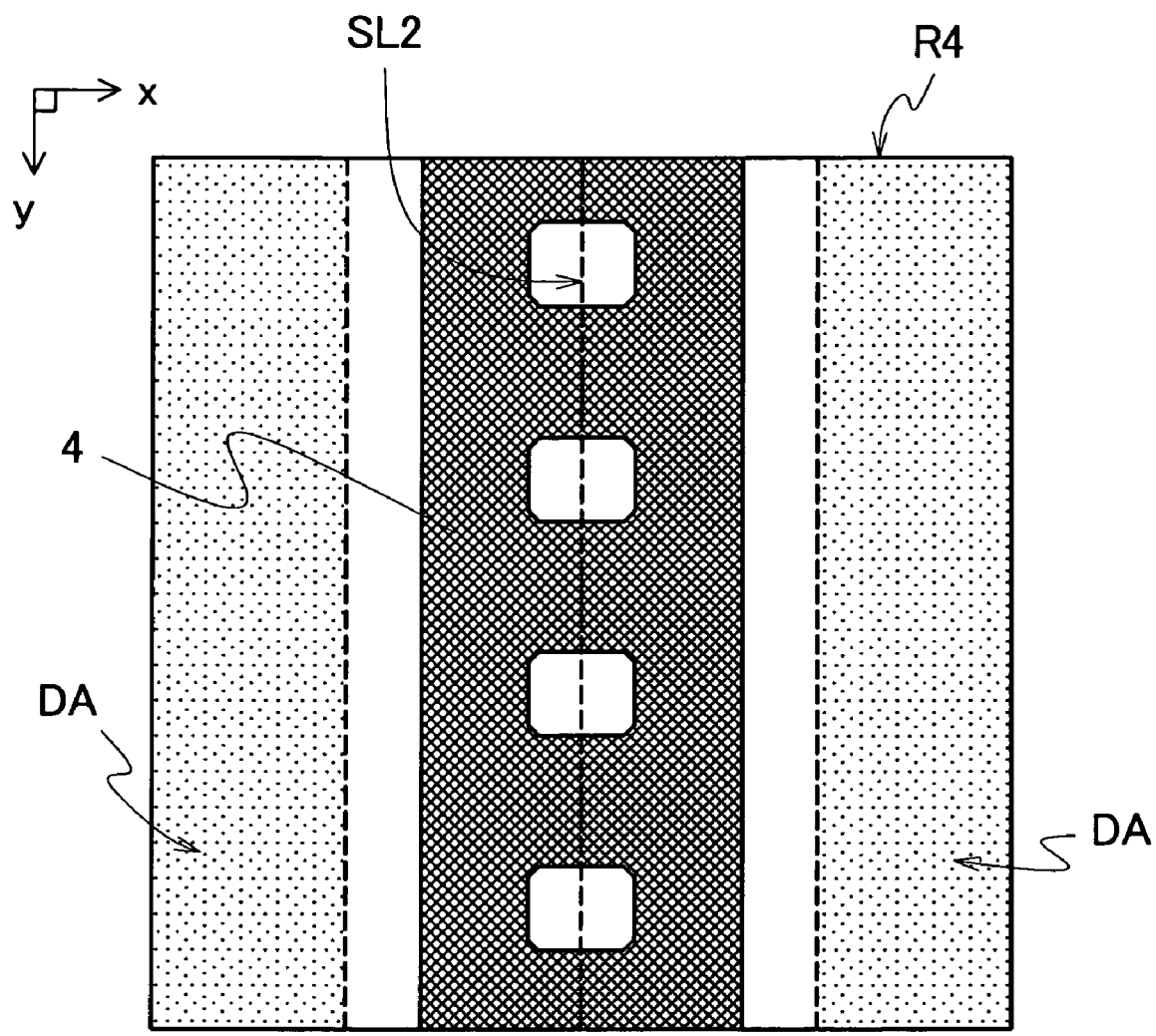
FIG. 5B is a schematic front view showing a first modification of the planar shape of the sealing material after curing when the sealing material is printed as shown in FIG. 5A.

FIG. 5A and FIG. 5B are schematic views for explaining a first modification of the manufacturing method of liquid crystal display panels of the above-mentioned embodiment.

FIG. 5A is a schematic front view showing a first modification of the printing method of the sealing material. FIG. 5B is a schematic front view showing a first modification of the planar shape of the sealing material after curing when the sealing material is printed as shown in FIG. 5A.

FIG. 5A and FIG. 5B respectively show the planar constitutions of a region corresponding to the region R in FIG. 2B. Further, the x direction and the y direction in FIG. 5A and FIG. 5B are respectively equal to the x direction and the y direction in FIG. 2B.

To explain the manufacturing method of liquid crystal display panels of the above-mentioned embodiment, in the example shown in FIG. 4A, the annular sealing material 4a which is formed in the region cut out as each TFT substrate is formed by the same method as the conventional manufacturing method, that is, by the method where widths (sizes in the direction perpendicular to the cutting line) of respective portions of the annular sealing material 4a are made uniform. In this case, when the second mother glass 8 is adhered to the first mother glass 7 and the sealing material 4 is cured, for example, as shown in FIG. 4B, a portion of the annular sealing material 4a which is brought into contact with the island-shaped sealing material 4b exhibits a planar shape projecting toward a display region DA side. Accordingly, when the distance W1 between the outer periphery of the display region DA and the inner periphery of the sealing material 4 is short, there exists a possibility that a portion of the sealing material 4 which projects toward the display region DA side overlaps with the display region DA, for example. Further, due to the projection of such a portion of the sealing material 4 toward the display region DA side, a space in which the liquid crystal material 3 is hermetically filled is narrowed and hence, an excess quantity of liquid crystal material 3 is increased relatively. Accordingly, for example, a quantity of liquid crystal material 3 which intrudes into a contact interface between the second mother glass 8 and the sealing material 4 is increased thus giving rise to a possibility that an adhesive strength between the second mother glass 8 and the sealing material 4 is lowered.

To prevent the occurrence of such a drawback, at the time of printing the annular sealing material 4a, for example, as shown in FIG. 5A, it is desirable to set a width W3a' of the portion of the annular sealing material 4a which is brought into contact with the island-shaped sealing material 4b smaller than a width W3b' of a portion of the annular sealing material 4a which is not brought into contact with the island-shaped sealing material 4b. Due to such constitution, when the second mother glass 8 is adhered to the first mother glass 7 and the sealing material 4 (4a, 4b) is cured, the planar shape of the sealing material 4 exhibits a shape shown in FIG. 5B, for example, where the inner periphery of the sealing material 4 in the region which is cut out as one TFT substrate 1 becomes substantially parallel to the outer periphery of the display region DA. Accordingly, for example, it is possible to prevent the sealing material 4 from overlapping with the display region DA or the adhesive strength between the second mother glass 8 and the sealing material 4 from being lowered.

It is needless to say that the planar shape of the annular sealing material 4a at the time of printing is not limited to the planar shape shown in FIG. 4A or the planar shape shown in FIG. 5A and can be suitably changed.

FIG. 6A to FIG. 6D are schematic views for explaining second to fourth modifications of the manufacturing method of liquid crystal display panels of the above-mentioned embodiment.

Figure 6A:
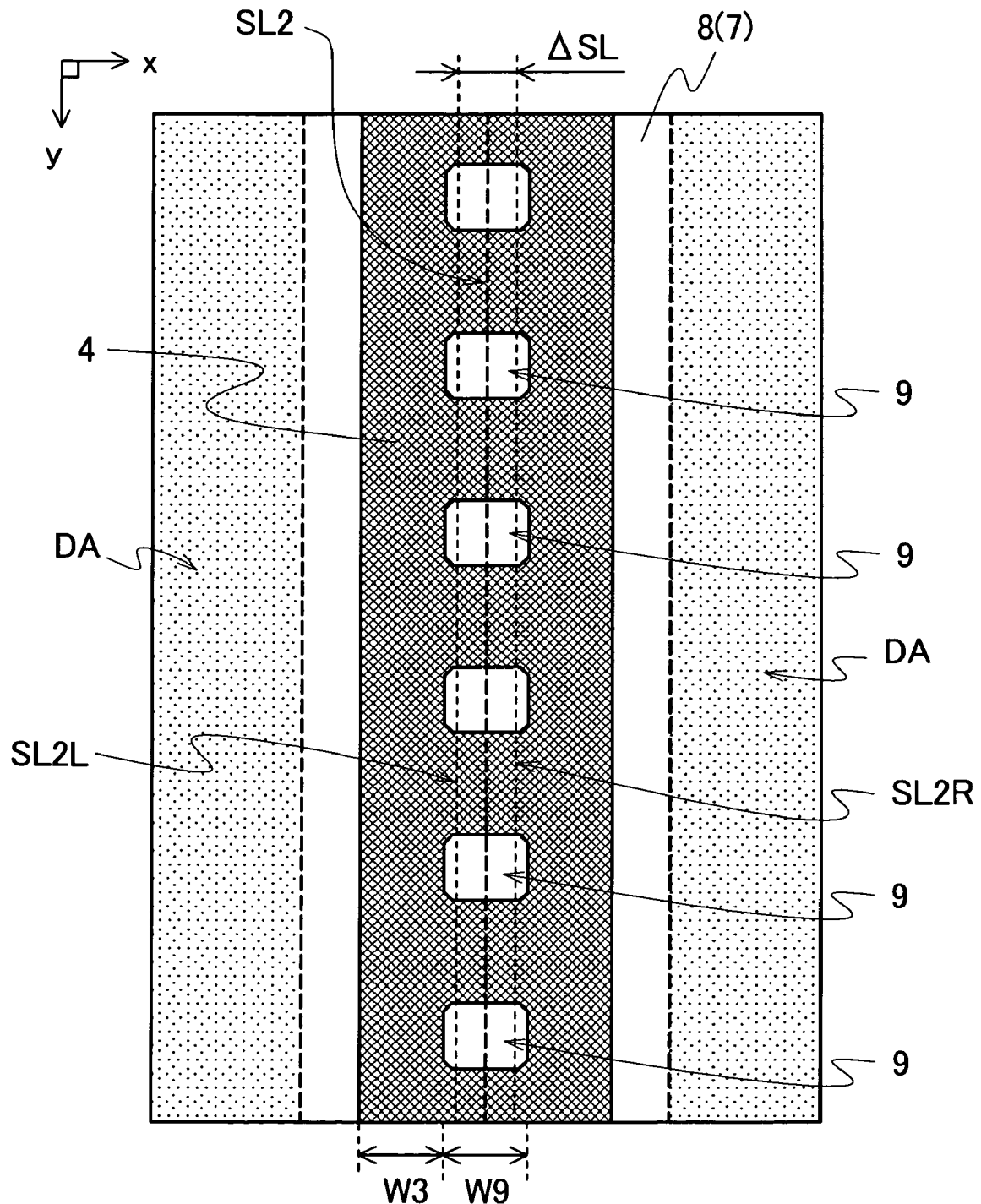
FIG. 6A is a schematic front view showing one typical example of the planar shape of the sealing material after curing in the manufacturing method of the liquid crystal display panel of the above-mentioned embodiment.
Figure 6B:
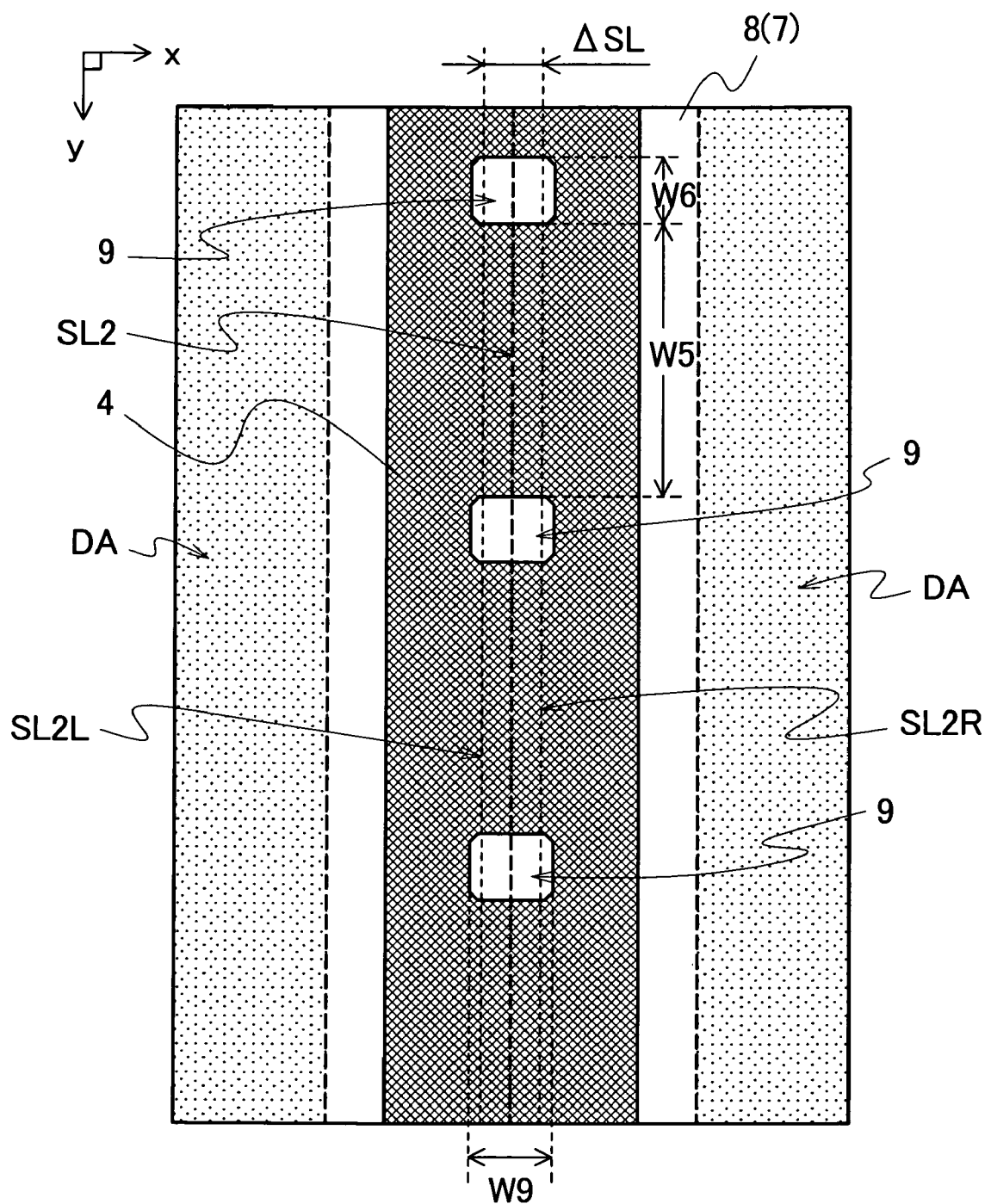
FIG. 6B is a schematic front view showing a second modification of the planar shape of the sealing material after curing.
Figure 6C:
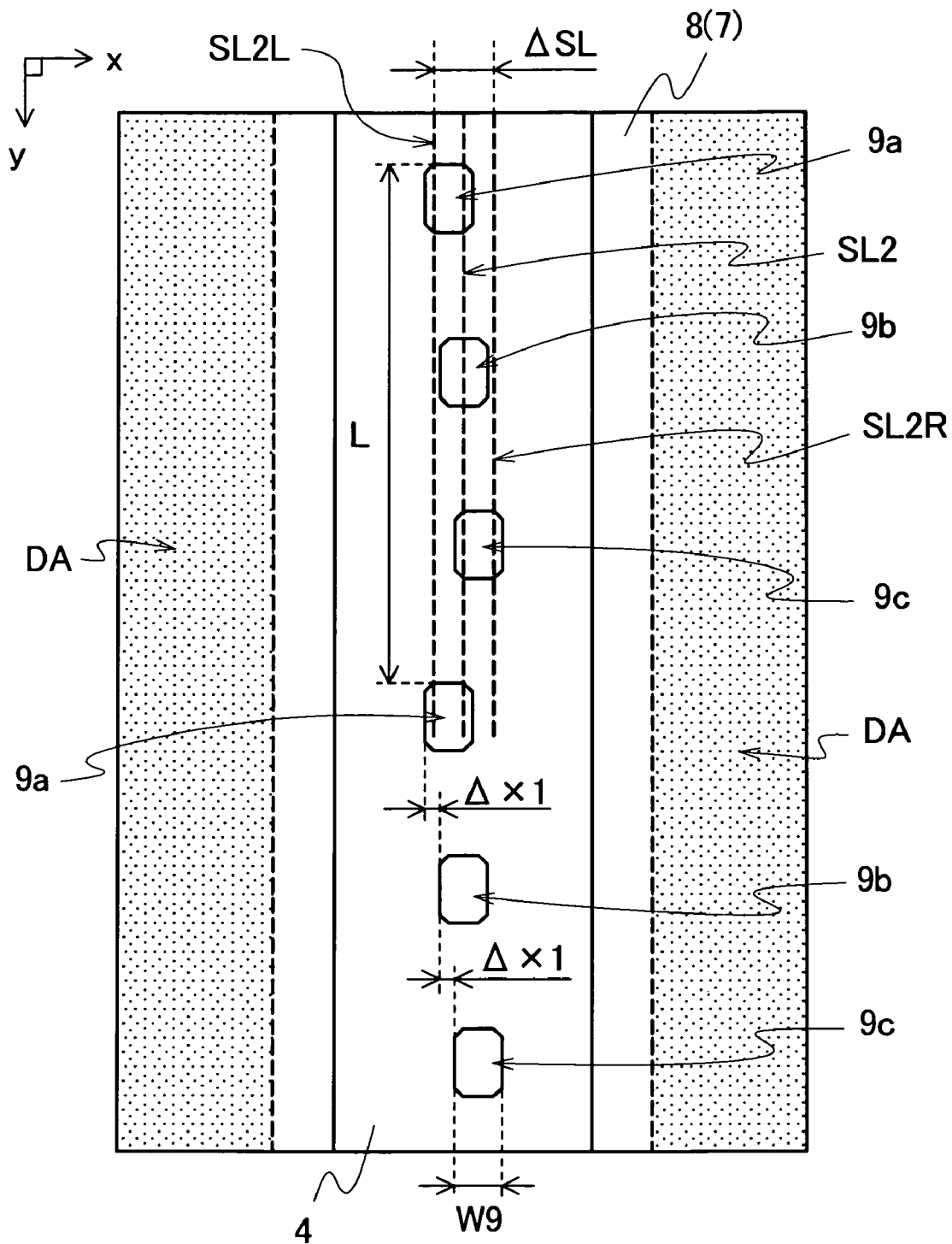
FIG. 6C is a schematic front view showing a third modification of the planar shape of the sealing material after curing.
Figure 6D:
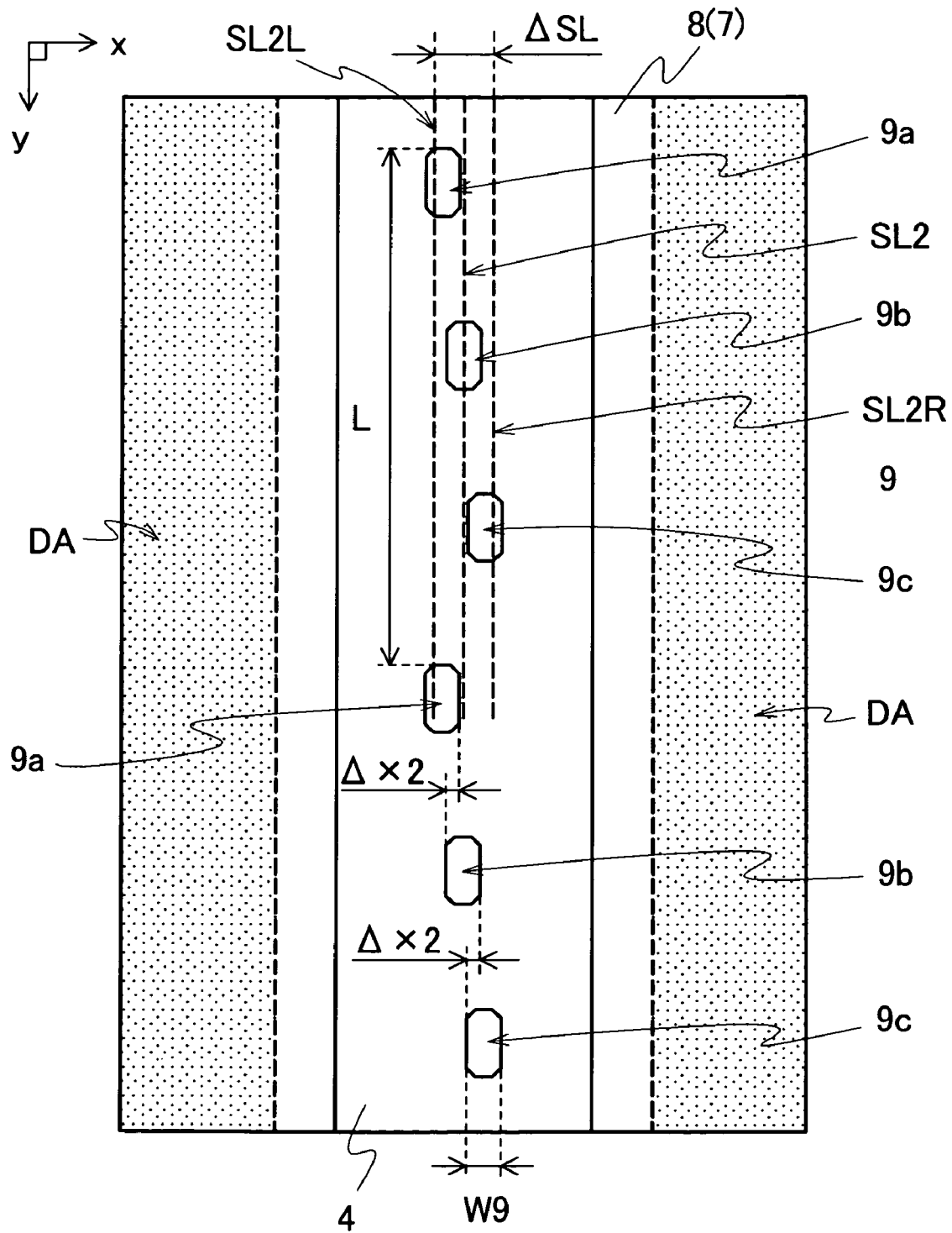
FIG. 6D is a schematic front view showing a fourth modification of the planar shape of the sealing material after curing.

FIG. 6A is a schematic front view showing one typical example of the planar shape of the sealing material after curing in the manufacturing method of liquid crystal display panels of the above-mentioned embodiment. FIG. 6B is a schematic front view showing a second modification of the planar shape of the sealing material after curing. FIG. 6C is a schematic front view showing a third modification of the planar shape of the sealing material after curing. FIG. 6D is a schematic front view showing a fourth modification of the planar shape of the sealing material after curing.

Here, FIG. 6A to FIG. 6D respectively show the planar constitution when a region corresponding to the region R4 in FIG. 2B is viewed in an expanded manner in the y direction. Here, the x direction and the y direction in FIG. 6A to FIG. 6D are respectively equal to the x direction and the y direction in FIG. 2B.

To explain the manufacturing method of liquid crystal display panels of the above-mentioned embodiment, in the example shown in FIG. 4B, a size W5' of the island-shaped sealing material 4b on the cutting line SL2 in the y direction and a gap W6' between the island-shaped sealing materials 4b on the cutting line SL2 are substantially equal and, at the same time, sizes and positions as viewed in the x direction of spaces formed in the sealing material 4 after curing are also substantially equal. Here, with respect to the sealing material 4 after curing, for example, as shown in FIG. 6A, to take the cutting tolerance $\Delta SL$ into consideration, it is desirable that the spaces 9 formed in the sealing material 4 are arranged at an actually cut position even when the displacement between the actually cut position and the predetermined cutting line SL2 assumes a maximum value. Accordingly, it is desirable to set a size W9 of the spaces 9 in the x direction larger than the cutting tolerance $\Delta SL$ in forming the sealing material 4.

However, when the size W9 of the space 9 formed in the sealing material 4 in the x direction is set larger than the cutting tolerance $\Delta SL$, the adhesive area between the first mother glass 7 (or the second mother glass 8) and the sealing material 4 is decreased by an amount corresponding to the size difference and hence, when the spaces 9 are arranged densely, it may be difficult to ensure a sufficient adhesive strength.

To obviate such a possibility, in forming the sealing material 4, for example, as shown in FIG. 6B, a size W5 of the above-mentioned first portion in the y direction in the planar shape after curing may be set several times as large as a size W6 of the above-mentioned second portion (space 9) in the y direction in the planar shape after curing. Also in this case, when the spaces 9 are arranged at the actually cut position, the sealing material 4 can be cut easily. Further, by elongating the size W5 of the first portion, the adhesive areas between the mother glasses 7, 8 and the sealing material 4 can be enlarged thus increasing the adhesive strength. Accordingly, it is possible to prevent peeling of the adhering surfaces between the mother glasses 7, 8 and the sealing material 4 attributed to an impact at the time of cutting the sealing material 4, for example.

Here, with respect to the planar shape of the sealing material 4 after curing shown in FIG. 4B, FIG. 5B, FIG. 6A and FIG. 6B, all spaces 9 have substantially the same size. In the actual manufacture of liquid crystal display panels, however, there exists a possibility that irregularities occur among sizes of the respective spaces 9 due to printing irregularities of the sealing materials 4a, 4b or irregularities of deformation quantities at the time of adhering the second mother glass 8 to the first mother glass 7, for example. Accordingly, in cutting the sealing material 4 within a range of the cutting tolerance $\Delta SL$, there exist a case in which all spaces 9 are arranged on the cutting line and a case in which only some spaces 9 are arranged on the cutting line. Also in such a case, provided that the spaces 9 exist at intervals shorter than predetermined intervals on the cutting line, peeling of the adhering surfaces between the mother glasses 7, 8 and the sealing material 4 attributed to an impact at the time of cutting the sealing material 4 can be reduced.

Accordingly, in forming the sealing material 4, for example, as shown in FIG. 6C, the sealing material 4 may be formed such that positions of spaces 9a, 9b, 9c in the x direction in a planar shape after curing may be displaced from each other by a distance $\Delta x1$. In the example shown in FIG. 6C, three spaces 9a, 9b, 9c arranged in the y direction are formed as one unit, and the positions of these three spaces 9a, 9b, 9c in the x direction are respectively displaced from each other by the distance $\Delta x1$. Due to such constitution, for example, when the sealing material 4 is cut along the predetermined cutting line SL2, all spaces 9a, 9b, 9c exist on the cutting line SL2. Further, when the sealing material 4 is cut at a position (for example, along a cutting line SL2L) displaced toward a left side of the predetermined cutting line SL2, the space 9a which has the position thereof in the x direction displaced by the distance $\Delta x1$ in the $-x$ direction exists on the cutting line SL2L. Further, when the sealing material 4 is cut at a position (for example, along a cutting line SL2R) displaced toward a right side of the predetermined cutting line SL2, the space 9a which has the position thereof in the x direction displaced by the distance $\Delta x1$ in the $+x$ direction exists on the cutting line SL2R. Accordingly, provided that the sealing material 4 is cut within a range of the cutting tolerance $\Delta SL$, the spaces 9 exist on the cutting line at a cycle equal to or less than the distance L and hence, peeling of the adhering surfaces between the mother glasses 7, 8 and the sealing material 4 attributed to an impact at the time of cutting the sealing material 4 can be reduced.

Further, when the planar shape of the sealing material 4 after curing exhibits the shape shown in FIG. 6C, for example, compared to a case in which the same number of spaces 9 (9a, 9b, 9c) have the shape shown in FIG. 6A, sizes W4 of the individual spaces 9 (9a, 9b, 9c) in the x direction can be decreased and hence, the adhesive areas between the mother glasses 7, 8 and the sealing material 4 can be increased by an amount corresponding to the reduction of sizes W4. Accordingly, the adhesive strengths between the mother glasses 7, 8 and the sealing material 4 can be increased thus lowering peeling of the adhering surfaces between the mother glasses 7, 8 and the sealing material 4.

Further, in the example shown in FIG. 6C, when the sealing material 4 is cut along the predetermined cutting line SL2, all spaces 9a, 9b, 9c exist on the cutting line SL2. However, to consider the combination of the example shown in FIG. 6C and the example shown in FIG. 6B, when the sealing material 4 is cut along the predetermined cutting line SL2, it is not necessary that all spaces 9a, 9b, 9c exist on the cutting line SL2. That is, the planar shape of the sealing material 4 after curing may, for example, as shown in FIG. 6D, have a shape in which only the space 9b out of the spaces 9a, 9b, 9c exists on the predetermined cutting line SL2. In this case, for example, by overlapping the space 9a and the space 9b with each other by a distance Δx2 and by overlapping the space 9b and the space 9c with each other by the distance Δx2, provided that the sealing material 4 is cut within a range of the cutting tolerance ΔSL, any one of the spaces 9a, 9b, 9c never fails to exist on the cutting line.

Figure 7A:
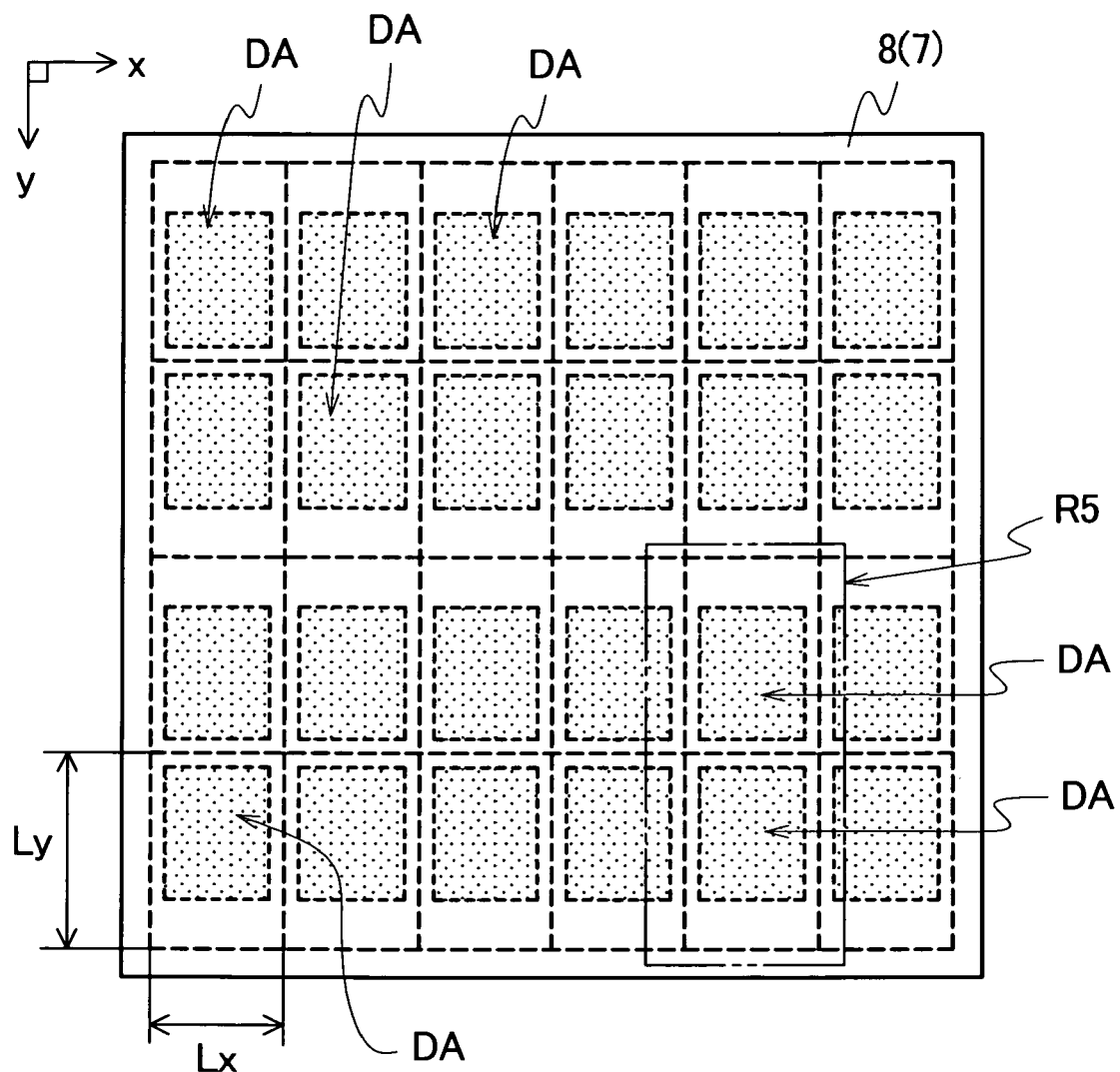
FIG. 7A is a schematic front view showing one example of the schematic constitution of the whole mother glass immediately after adhering the pair of mother glasses in a first application example of the manufacturing method of liquid crystal display panels of the above-mentioned embodiment.
Figure 7B:
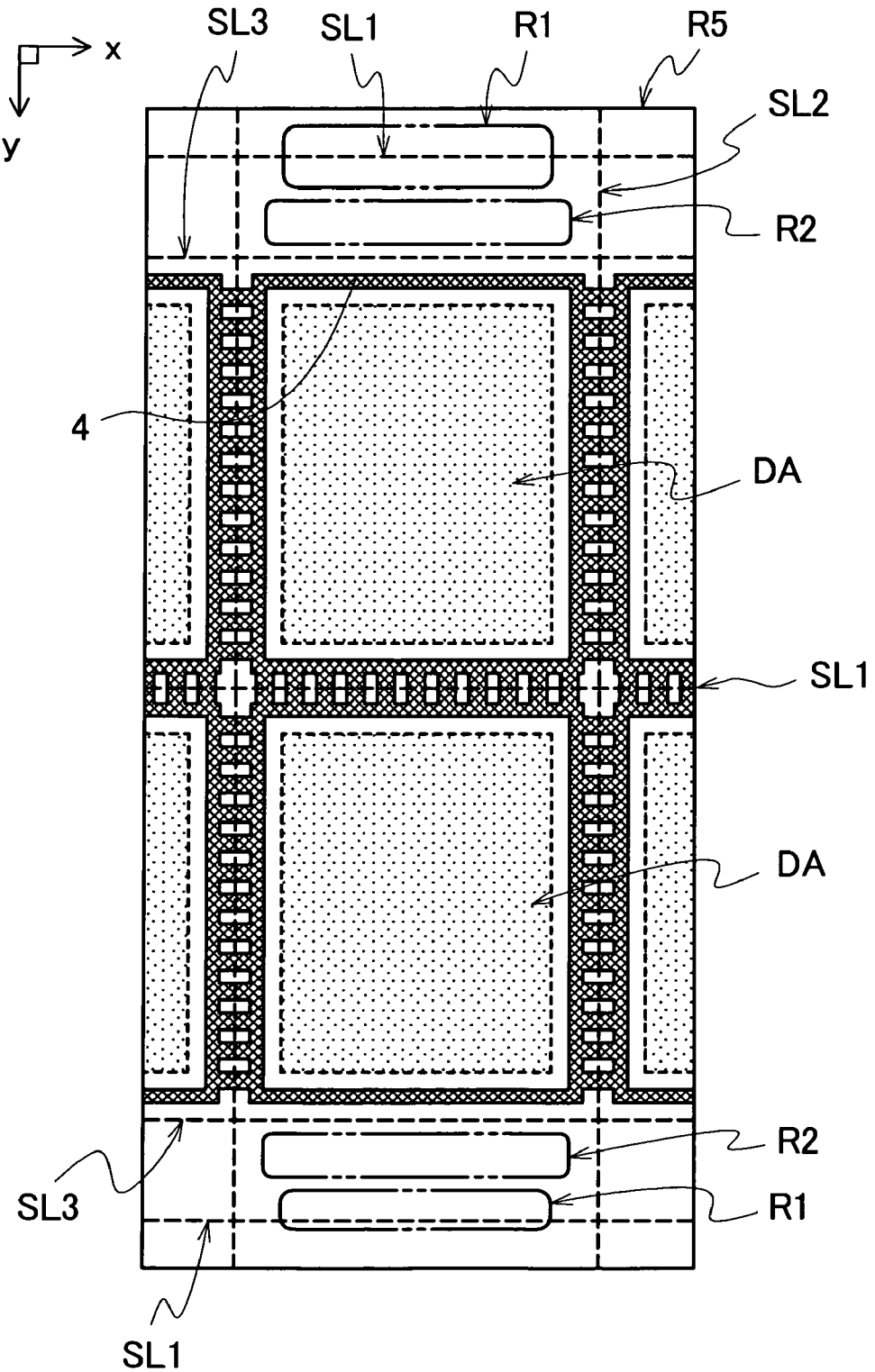
FIG. 7B is a schematic enlarged front view showing a region R5 shown in FIG. 7A in an enlarged manner.
Figure 7C:
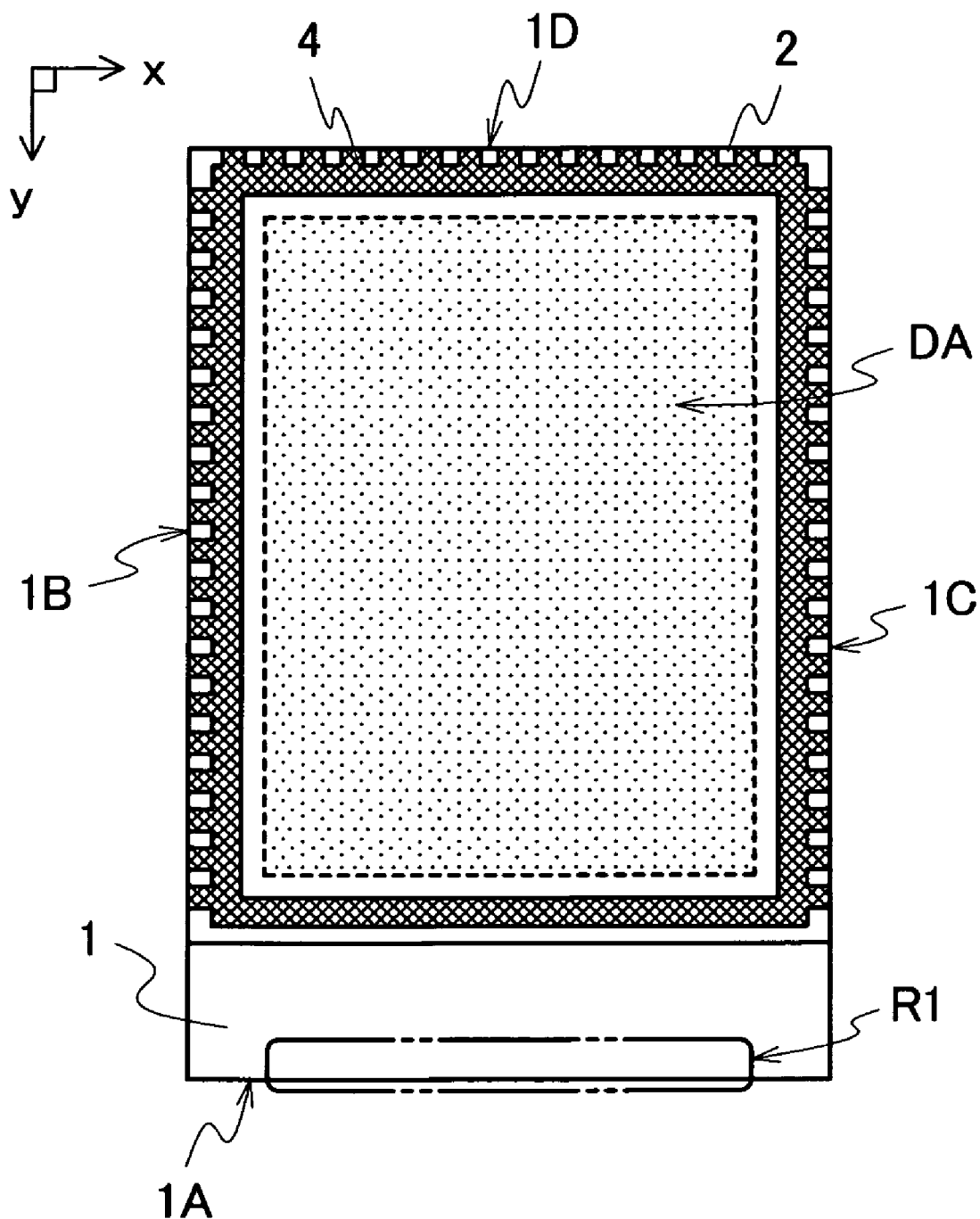
FIG. 7C is a schematic front view showing one example of the schematic constitution of one piece of liquid crystal display panel obtained by adopting the first application example.

FIG. 7A to FIG. 7C are schematic views for explaining the first application example of the manufacturing method of liquid crystal display panels of the above-mentioned embodiment.

FIG. 7A is a schematic front view showing one example of the schematic constitution of the whole mother glass immediately after adhering the pair of mother glasses in the first application example of the manufacturing method of liquid crystal display panels of the above-mentioned embodiment. FIG. 7B is a schematic enlarged front view showing the region R5 in FIG. 7A in an enlarged manner. FIG. 7C is a schematic front view showing one example of the schematic constitution of one piece of liquid crystal display panel obtained by adopting the first application example.

The x direction and the y direction in FIG. 7A to FIG. 7C are respectively equal to the x direction and the y direction in FIG. 2B.

In the above-mentioned embodiment, for example, as shown in FIG. 2A, exemplified is the case in which all of the plurality of (24 pieces of) TFT substrates 1 which are cut out from the first mother glass 7 and the plurality of (24 pieces of) counter substrates 2 which are cut out from the second mother glass 8 for forming are arranged on the same direction. That is, to focus on a boundary of the regions which are cut out as two neighboring TFT substrates 1 in the y direction, one TFT substrate 1 has a side 1A on which the external connection terminals are arranged, and another TFT substrate 1 has a side which faces the side 1A on which the external connection terminals are arranged.

Such an arrangement is relevant to the rubbing direction at the time of applying rubbing treatment to the alignment film formed on the surface of the TFT substrate 1 and the alignment film formed on the surface of the counter substrate 2, for example, and is provided for aligning the rubbing direction of the alignment films of all liquid crystal display panels.

Accordingly, when the liquid crystal display panels which adopt a VA method (Vertical Alignment method) so that rubbing treatment of alignment films is unnecessary are manufactured by a multi-piece simultaneously forming method, for example, as shown in FIG. 7A and FIG. 7B, regions which are cut out as two neighboring TFT substrates 1 in the y direction may be formed as a set, and the side 1A on which the external connection terminals are arranged and the side which faces the side 1A may be brought into contact with each other in the boundary between two regions.

By adopting such an arrangement, on the boundary where the side 1A on which the external connection terminals are arranged and the side which faces the side 1A of the regions which are cut out as two neighboring TFT substrates 1 in the y direction, for example, as shown in FIG. 7B, an annular portion of the sealing material 4 formed in one region and an annular portion of the sealing material 4 formed in another region can be connected with each other at a plurality of portions. Accordingly, the adhesive area between the sealing material 4 and the mother glasses 7, 8 at a zone which extends along the side 1A on which the external connection terminals are arranged and the side which faces the side 1A can be also increased thus further reducing peeling of the adhering surface between the TFT substrate 1 and the sealing material 4 and peeling of the adhering surface between the counter substrate 2 and the sealing material 4.

Further, the arrangement of the liquid crystal display panels on each of the pair of mother glasses 7, 8 adopts such an arrangement, when the mother glasses 7, 8 are divided into the individual liquid crystal display panels by cutting, the planar shape of the obtained liquid crystal display panel becomes as shown in FIG. 7C, for example. That is, with respect to an outer periphery of the sealing material 4 as viewed in a plan view of the TFT substrate 1, the zone where the above-mentioned first portions and the above-mentioned second portions are arranged alternately exists in portions which are respectively arranged along three sides 1B, 1C, 1D except for the side 1A on which the external connection terminals of the TFT substrate 1 are arranged.

Figure 8:
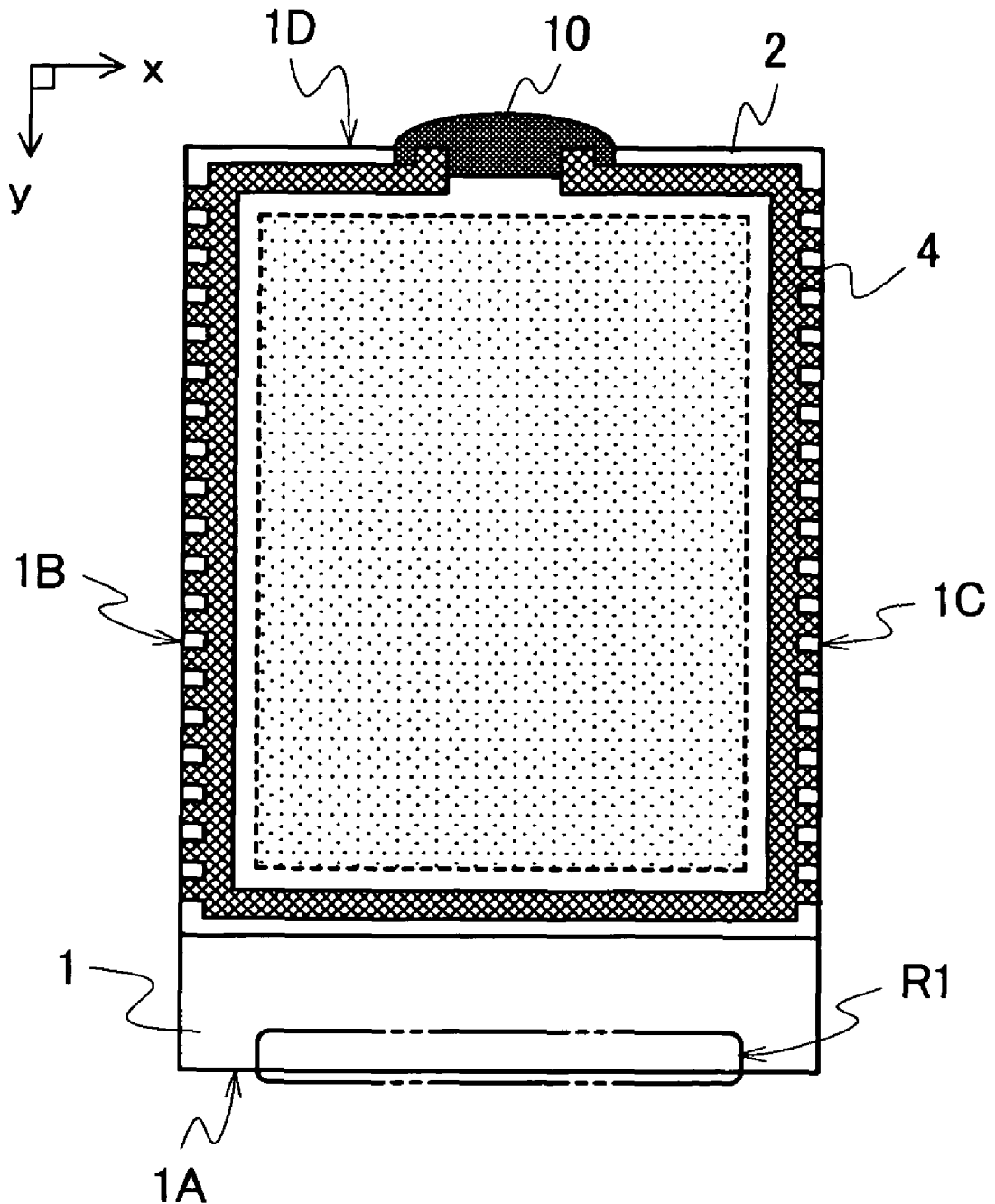
FIG. 8 is a schematic front view for explaining a second application example of the manufacturing method of liquid crystal display panels of the above-mentioned embodiment.

FIG. 8 is a schematic front view for explaining a second application example of the manufacturing method of liquid crystal display panels of the above-mentioned embodiment.

In the above-mentioned embodiment, the manufacturing method of liquid crystal display panels in which the liquid crystal material is filled by a liquid crystal dropping sealing method is exemplified. The sealing material 4 of the liquid crystal display panel obtained by such a manufacturing method exhibits a closed annular shape as shown in FIG. 4E, for example.

However, the invention is not limited to the manufacturing method of liquid crystal display panels in which the liquid crystal material is filled by a liquid crystal dropping sealing method, and is applicable to a manufacturing method of liquid crystal display panels in which a liquid crystal material 3 is filled in the individual liquid crystal display panels after these liquid crystal display panels are cut out from the mother glasses 7, 8. In this case, the sealing material 4 in the obtained liquid crystal display panel is, for example, as shown in FIG. 8, formed in an open annular shape, wherein a filling port of the liquid crystal material 3 is formed in a portion of a side 1D which faces a side 1A of the TFT substrate 1 on which external connection terminals are formed. Here, the filling port formed in the sealing material 4 is sealed by another resin material 10 after filling the liquid crystal material 3, for example.

Also in the manufacturing method of liquid crystal display panels having such constitution, for example, by printing the sealing material 4 on the surface of the first mother glass 7 and by adhering the second mother glass 8 to the first mother glass 7 in the manner described in conjunction with the above-mentioned embodiment, the contact areas between the mother glasses 7, 8 and the sealing material 4 can be increased. Accordingly, peeling of the adhering surface between the first mother glass 7 (TFT substrate 1) and the sealing material 4 and peeling of the adhering surface between the second mother glass 8 (counter substrate 2) and the sealing material 4 attributed to an impact at the time of cutting the first mother glass 7 and the second mother glass 8, for example, can be reduced.

Although the invention has been specifically explained in conjunction with the embodiments heretofore, it is needless to say that the invention is not limited to the above-mentioned embodiments and various modifications are conceivable without departing from the gist of the invention.

For example, in the above-mentioned embodiment, the manufacturing method of liquid crystal display panels in which the liquid crystal material 3 is filled in the space defined between the pair of substrates (TFT substrate 1 and the counter substrate 2) is exemplified. However, it is needless to say that the invention is not limited to such a manufacturing method of liquid crystal display panels, and is also applicable to a manufacturing method of liquid crystal display panels in which a first substrate and a second substrate are adhered to each other by an annular sealing material (adhesive material) which surrounds a display region such as a self-luminous-type display panel using an organic EL (Electro-Luminescence), for example.

What is claimed is:

1. A display device comprising:
 a first substrate on which a predetermined integrated circuit is formed;
 a second substrate which is arranged on one surface of the first substrate in an overlapping manner; and
 an adhesive material which is arranged between the first substrate and the second substrate and has an annular planar shape as viewed from the surface of the first substrate, the adhesive material being provided for adhering the first substrate and the second substrate, wherein
 an outer periphery of the adhesive material as viewed from the surface of the first substrate includes a zone which is constituted of a plurality of first portions passing substantially the same position as an outer periphery of the surface of the first substrate and a plurality of second portions each of which is connected with said two neighboring first portions and has a center portion thereof in a peripheral direction retracted toward an inner peripheral side of the adhesive material as viewed from the surface of the first substrate.

2. A display device according to claim 1, wherein the adhesive material is configured such that a distance between the first portion and an inner periphery of the adhesive material as viewed from the surface of the first substrate is longer than a distance between the center portion of the second portion in the peripheral direction and the inner periphery of the adhesive material as viewed from the surface of the first substrate.

3. A display device according to claim 2, wherein the surface of the first substrate has an approximately rectangular shape, and the zone exists on portions of the outer periphery of the adhesive material which extend along two respective sides of the outer periphery of the surface of the first substrate which are arranged parallel to each other.

4. A display device according to claim 3, wherein external connection terminals of the integrated circuit are arranged along one side of the outer periphery of the surface of the first substrate, and
 the zone of the adhesive material exists on portions of the outer periphery of the surface of the first substrate which extend along two respective sides of the first substrate which are connected with the side of the first substrate along which the external connection terminals are arranged.

5. A display device according to claim 4, wherein said two neighboring second portions differ from each other in a retracting quantity thereof from the outer periphery of the first substrate at the center portion in the peripheral direction.

6. A display device according to claim 4, wherein the display panel is a liquid crystal display panel in which a liquid crystal material is filled between the first substrate and the second substrate.

7. A display device according to claim 2, wherein a size of the first portion in the peripheral direction is set larger than a size of the second portion in the peripheral direction.

8. A display device according to claim 2, wherein the adhesive material is a photo-curing resin.

9. A display device according to claim 2, wherein the adhesive material has an open annular planar shape as viewed from the surface of the first substrate.

10. A display device according to claim 1, wherein the plurality of second portions exhibits a substantially same retracting quantity from the outer periphery of the first substrate at the center portion of the second portion in the peripheral direction.

11. A display device according to claim 1, wherein a size of the first portion in the peripheral direction and a size of the second portion in the peripheral direction are substantially equal to each other.

12. A display device according to claim 1, wherein the adhesive material has a closed annular planar shape as viewed from the surface of the first substrate.

* * * * *